US012056984B2

(12) United States Patent
Bolling, Jr.

(10) Patent No.: US 12,056,984 B2
(45) **Date of Patent: *Aug. 6, 2024**

(54) PROVIDING A PREDETERMINED RETURN-TO-PLAYER FOR A SKILL-BASED WAGERING MACHINE

(71) Applicant: Aristocrat Technologies Australia Pty Limited, North Ryde (AU)

(72) Inventor: T. Grant Bolling, Jr., Reno, NV (US)

(73) Assignee: ARISTOCRAT TECHNOLOGIES AUSTRALIA PTY LIMITED, North Ryde (AU)

( * ) Notice: Subject to any disclaimer, the term of this patent is extended or adjusted under 35 U.S.C. 154(b) by 54 days.

This patent is subject to a terminal disclaimer.

(21) Appl. No.: 17/731,889

(22) Filed: Apr. 28, 2022

(65) Prior Publication Data

US 2022/0254230 A1 Aug. 11, 2022

Related U.S. Application Data

(63) Continuation of application No. 16/843,575, filed on Apr. 8, 2020, now Pat. No. 11,386,752, which is a continuation of application No. 16/020,012, filed on Jun. 27, 2018, now Pat. No. 10,636,250, which is a continuation-in-part of application No. 16/006,507, filed on Jun. 12, 2018, now Pat. No. 10,796,529.

(51) Int. Cl.
*G07F 17/32* (2006.01)

(52) U.S. Cl.
CPC ...... *G07F 17/3258* (2013.01); *G07F 17/3251* (2013.01); *G07F 17/326* (2013.01); *G07F 17/3295* (2013.01)

(58) Field of Classification Search
None
See application file for complete search history.

(56) References Cited

U.S. PATENT DOCUMENTS 5,342,049 A 8/1994 Wichinsky
5,882,258 A 3/1999 Kelly
(Continued)

OTHER PUBLICATIONS

Notice of Allowance dated May 6, 2020 for U.S. Appl. No. 16/006,507 (pp. 1-13).

(Continued)

*Primary Examiner* — Lawrence S Galka
(74) *Attorney, Agent, or Firm* — McAndrews, Held & Malloy, Ltd.

(57) ABSTRACT

A method, computer readable medium, and game machine are presented, that provide a skill-based game of a wagering machine with a predetermined return-to-player. The method includes constructing, for each initial game state of a plurality of initial game states, a decision tree that includes a root node, intermediary nodes, leaf nodes, and collective leaf nodes that each represents a class of game states and its expected minimum payout. The method further includes determining, based on the decision tree for each initial game state, an expected minimum payout for the respective initial game state; and generating, for the wagering machine, a table that weights each initial game state of the plurality of initial games states based on its respective expected minimum payout to achieve a desired minimum return-to-player.

20 Claims, 14 Drawing Sheets

(56) References Cited

U.S. PATENT DOCUMENTS

| | | | | |
|---|---|---|---|---|
| 6,007,426 | A | 12/1999 | Kelly | |
| 6,488,580 | B1 * | 12/2002 | Robb | A63F 9/24 463/23 |
| 6,942,571 | B1 | 9/2005 | McAllister | |
| 7,727,064 | B1 * | 6/2010 | Luciano, Jr. | G07F 17/329 463/19 |
| 10,699,517 | B1 | 6/2020 | Berman | |
| 2003/0027619 | A1 | 2/2003 | Nicastro | |
| 2007/0054728 | A1 * | 3/2007 | Hood | G07F 17/32 463/16 |
| 2008/0311980 | A1 | 12/2008 | Cannon | |
| 2009/0061999 | A1 * | 3/2009 | Popovich | G07F 17/3262 463/26 |
| 2009/0239662 | A1 | 9/2009 | Bramble | |
| 2010/0160030 | A1 | 6/2010 | Indrakumar | |
| 2011/0009178 | A1 * | 1/2011 | Gerson | G07F 17/3295 463/25 |
| 2011/0218035 | A1 * | 9/2011 | Thomas | G07F 17/3267 463/25 |
| 2011/0294561 | A1 * | 12/2011 | Shaw | G07F 17/3244 463/16 |
| 2011/0300937 | A1 | 12/2011 | Crowder, Jr. | |
| 2013/0252708 | A1 | 9/2013 | Englman | |
| 2013/0281171 | A1 * | 10/2013 | Ramsour | G07F 17/326 463/10 |
| 2014/0011567 | A1 | 1/2014 | Penacho | |
| 2016/0343211 | A1 * | 11/2016 | Graboyes Goldman | G07F 17/3225 |
| 2017/0084129 | A1 * | 3/2017 | Baerlocher | G07F 17/3211 |
| 2017/0103609 | A1 | 4/2017 | Plowman | |
| 2017/0301178 | A1 | 10/2017 | Thomas | |
| 2019/0259242 | A1 * | 8/2019 | Cire | G07F 17/3209 |

OTHER PUBLICATIONS

Wikipedia article “Bejeweled”, 3 pages.

Wikipedia article “Candy Crush Saga”, 8 pages.

Notice of Allowance dated Jun. 18, 2020 for U.S. Appl. No. 16/006,507 (pp. 1-5).

Office Action dated Jul. 9, 2021 for U.S. Appl. No. 16/822,785 (pp. 1-10).

Office Action (Notice of Allowance and Fees Due (PTOL-85)) dated Sep. 21, 2021 for U.S. Appl. No. 16/822,785 (pp. 1-8).

Office Action (Non-Final Rejection) dated Sep. 30, 2021 for U.S. Appl. No. 16/843,575 (pp. 1-5).

Office Action (Notice of Allowance and Fees Due (PTOL-85)) dated May 9, 2022 for U.S. Appl. No. 17/011,368 (pp. 1-9).

Office Action (Notice of Allowance and Fees Due (PTOL-85)) dated Feb. 25, 2022 for U.S. Appl. No. 16/843,575 (pp. 1-8).

Office Action (Notice of Allowance and Fees Due (PTOL-85)) dated Jun. 8, 2022 for U.S. Appl. No. 16/843,575 (pp. 1-2).

Australian Examination Report No. 1 issued in App. No. AU2019204066, dated Feb. 26, 2024, 2 pages.

Office Action (Notice of Allowance and Fees Due (PTOL-85)) dated Feb. 23, 2023 for U.S. Appl. No. 17/819,514 (pp. 1-7).

* cited by examiner 600 610₁ 610₂ 610₃ 610₄ 610₅

| Stop # | Reel 1 | Reel 2 | Reel 3 | Reel 4 | Reel 5 |
|---|---|---|---|---|---|
| 19 | | | C | | |
| 18 | | | C | | |
| 17 | | | B | | |
| 16 | A | | A | | |
| 15 | D | | G | | |
| 14 | E | A | F | | |
| 13 | F | C | D | | D |
| 12 | C | B | E | | B |
| 11 | D | A | C | D | C |
| 10 | B | E | D | D | A |
| 9 | C | D | A | C | B |
| 8 | A | C | B | B | D |
| 7 | B | A | B | D | E |
| 6 | A | B | C | C | F |
| 5 | A | A | B | D | A |
| 4 | B | B | C | A | B |
| 3 | A | C | C | B | D |
| 2 | C | A | A | E | E |
| 1 | B | B | C | E | C |
| 0 | B | B | A | D | E |

800

| REEL 1 | REEL 2 | REEL 3 | REEL 4 | REEL 5 | MinVal | MaxVal | MeanVal | Num Tumbles | Num Choices on Screen |
|---|---|---|---|---|---|---|---|---|---|
| 0 | 0 | 0 | 0 | 0 | 15 | 1125 | 254 | 5 | 7 |
| 0 | 0 | 0 | 0 | 1 | 15 | 1045 | 222 | 3 | 6 |
| 0 | 0 | 0 | 0 | 2 | 15 | 1125 | 212 | 3 | 6 |
| 0 | 0 | 0 | 0 | 3 | 15 | 1300 | 283 | 5 | 7 |
| 0 | 0 | 0 | 0 | 4 | n/a | n/a | n/a | n/a | n/a |
| 0 | 0 | 0 | 0 | 5 | 15 | 1130 | 190 | 3 | 7 |
| 0 | 0 | 0 | 0 | 6 | 15 | 1125 | 243 | 3 | 7 |
| 0 | 0 | 0 | 0 | 7 | n/a | n/a | n/a | n/a | n/a |
| 2 | 2 | 15 | 6 | 13 | 15 | 540 | 48 | 2 | 3 |
| 2 | 2 | 15 | 6 | 0 | 15 | 580 | 60 | 3 | 4 |
| 2 | 2 | 15 | 6 | 1 | 15 | 540 | 48 | 2 | 3 |
| 2 | 2 | 15 | 6 | 2 | 15 | 540 | 48 | 2 | 3 |
| 2 | 2 | 15 | 6 | 3 | 15 | 540 | 48 | 2 | 3 |
| 16 | 10 | 5 | 0 | 12 | n/a | n/a | n/a | n/a | n/a |
| 16 | 10 | 5 | 0 | 13 | 20 | 1165 | 514 | 3 | 1 |
| 16 | 10 | 5 | 1 | 0 | 15 | 1555 | 469 | 4 | 1 |
| 16 | 10 | 5 | 1 | 1 | n/a | n/a | n/a | n/a | n/a |
| 16 | 10 | 5 | 1 | 2 | n/a | n/a | n/a | n/a | n/a |
| 16 | 10 | 5 | 1 | 3 | 20 | 1045 | 465 | 3 | 1 |

FIG. 8

900

| Min Amt | # Occur | Avg of Max | Avg of Mean | Ratio Low/High | Ratio Low/Mean | Assigned Weight |
|---|---|---|---|---|---|---|
| 15 | 414843 | 1943.53 | 161.7496933 | 0.007717935 | 0.092735879 | 0 |
| 20 | 49964 | 1784.54 | 255.3368826 | 0.01120737 | 0.078327893 | 0 |
| 25 | 8408 | 1713.95 | 306.5210514 | 0.014586171 | 0.081560467 | 0 |
| 30 | 2417 | 1796.81 | 372.5353744 | 0.016696294 | 0.080529265 | 0 |
| | | | | | | |
| 615 | 2 | 765.00 | 690 | 0.803921569 | 0.891304348 | 1 |
| 620 | 1 | 1125.00 | 891 | 0.551111111 | 0.695847363 | 1 |
| 625 | 13 | 1641.92 | 948.6923077 | 0.380651206 | 0.658801589 | 0 |
| 630 | 6 | 1147.50 | 820.3333333 | 0.549019608 | 0.767980496 | 1 |
| 635 | 42 | 1014.05 | 819.7857143 | 0.626203334 | 0.774592664 | 1 |
| 640 | 3 | 1145.00 | 851.3333333 | 0.558951965 | 0.751761942 | 1 |
| 645 | 1 | 1390.00 | 1056 | 0.464028777 | 0.610795455 | 1 |
| 650 | 11 | 1137.73 | 940.3636364 | 0.571314423 | 0.691221964 | 1 |
| 660 | 1 | 1650.00 | 1161 | 0.4 | 0.568475452 | 1 |
| 770 | 1 | 785.00 | 778 | 0.98089172 | 0.989717224 | 1 |
| 785 | 1 | 1300.00 | 879 | 0.603846154 | 0.893060296 | 1 |
| 880 | 1 | 1385.00 | 1096 | 0.635379061 | 0.802919708 | 1 |
| 1020 | 30 | 1349.00 | 1178.633333 | 0.756115641 | 0.86540909 | 10 |
| 1025 | 63 | 3045.08 | 1368.984127 | 0.336608632 | 0.748730376 | 1 |
| 1030 | 23 | 1623.26 | 1140.304348 | 0.634525244 | 0.903267625 | 1 |
| 1035 | 26 | 1266.92 | 1105.961538 | 0.816939891 | 0.935837246 | 10 |
| 1040 | 24 | 1042.50 | 1041.166667 | 0.997601918 | 0.998879462 | 1 |
| 1045 | 12 | 1152.50 | 1085.666667 | 0.906724512 | 0.962542217 | 10 |
| 1050 | 9 | 1238.33 | 1092.444444 | 0.847913863 | 0.961147274 | 9 |
| 1055 | 2 | 1367.50 | 1128.5 | 0.771480804 | 0.934869296 | 1 |
| 1060 | 3 | 1060.00 | 1060 | 1 | 1 | 10 |
| | | | | | | |
| 1545 | 2 | 4632.50 | 1943.5 | 0.333513222 | 0.794957551 | 0 |
| 1550 | 3 | 2728.33 | 1672.333333 | 0.568112401 | 0.926848714 | 0 |
| 1645 | 1 | 2775.00 | 1723 | 0.592792793 | 0.954730122 | 0 |
| 2050 | 2 | 4585.00 | 2065 | 0.447110142 | 0.992736077 | 0 |

| Wtd A Min | Wtd A Max | Wtd A Mean | Wtd Min/Mx | Total Screens | Accepted Screens |
|---|---|---|---|---|---|
| 978.1553398 | 1206.141268 | 1063.910827 | 0.810979083 | 480308 | 1382 |

FIG. 9

PROVIDING A PREDETERMINED RETURN-TO-PLAYER FOR A SKILL-BASED WAGERING MACHINE

RELATED APPLICATIONS

This application is a continuation of U.S. patent application Ser. No. 16/843,575, having a filing date of Apr. 8, 2020, which is a continuation of U.S. patent application Ser. No. 16/020,012, having a filing date of Jun. 27, 2018, which is a continuation-in-part of U.S. patent application Ser. No. 16/006,507, having a filing date of Jun. 12, 2018, the contents of each of the above-identified applications is hereby incorporated herein by reference in their entirety.

TECHNICAL FIELD

The present disclosure relates to gaming and wagering, and more specifically to electronic gaming machines that permit wagering upon outcomes.

BACKGROUND

Electronic gaming machines (EGMs) or gaming machines provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to “cash out.”

Typical games use a random number generator (RNG) to randomly determine the outcome of each game. The game is designed to return a certain percentage of the amount wagered back to the player (i.e., return-to-player) over the course of many plays or instances of the game. The return-to-player and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

One issue with skill-based games is that gaming regulatory authorities generally require that gaming machines maintain a minimum return-to-player. Thus, in order to satisfy such regulatory requirements, manufactures are required to prove that the gaming machine satisfies the return-to-player requirements set forth by the regulatory authority. Conversely, casinos, hotels, and/or other gaming machine operators require assurances that the gaming machine does not payout more than a maximum return-to-player in order to ensure profitability. However, such return-to-player requirements are at odds with providing a player with meaningful, skill-based decisions that affect the player’s odds of winning a prize, and/or affect the prize amount won by the player.

Some aspects of the present disclosure address the above technical problem of satisfying return-to-player requirements of gaming regulatory authorities and gaming machine operators while providing players with skill-based choices that affect their odds of winning and/or amounts won.

SUMMARY

In some embodiments, a gaming machine includes a credit input mechanism, a player interface, a display device, and a game controller. The game controller increases a credit balance of a credit meter based on monetary value of a physical item received by the credit input mechanism, and decreases the credit balance based on a wager. The game controller further randomly selects an initial game screen from a plurality of initial game screens in a manner that ensures a predetermined minimum return-to-player. The game controller also displays symbols in display positions of the display device per an initial symbol arrangement specified by the selected initial game screen, and updates symbols in the display positions per the move represented by input signals to obtain updated symbols. The game controller increases the credit balance based on an award associated with the updated symbols.

In other embodiments, a method of playing a game of a gaming machine includes increasing a credit balance of a credit meter based on monetary value of a physical item received by a credit input mechanism of the gaming machine. The method also includes decreasing the credit balance based on a wager and randomly selecting an initial game screen from a plurality of initial game screens in a manner that ensures a predetermined minimum return-to-player. The method further includes displaying, in display positions of a display device, symbols per an initial symbol arrangement specified by the selected initial game screen. The method also includes updating symbols in the display positions per the move represented by the input signals to obtain updated symbols. Moreover, the method includes increasing the credit balance based on an award associated with the updated symbols.

In some embodiments, a method provides a predetermined return-to-player for a skill-based wagering machine. The method includes determining, for each initial game state of a plurality of initial game states, a predetermined expected minimum payout that accounts for skill-based moves of a player. The method further includes weighting each initial game state of the plurality of initial game states based on its respective predetermined expected minimum payout and a desired minimum return-to-player for the predetermined return-to-player.

In other embodiments, a non-transitory computer readable medium provides a predetermined return-to-player for a skill-based wagering machine. The computer readable medium includes a plurality of instructions that, in response to being executed, result in a computing device determining, for each initial game state of a plurality of initial game states, a predetermined expected minimum payout that accounts for skill-based moves of a player. Execution of the plurality of instructions further results in the computing device weighting each initial game state of the plurality of initial game states based on its respective predetermined expected minimum payout and a desired minimum return-to-player for a skill-based game.

In yet other embodiments, a gaming machine provides a predetermined return-to-player for a skill-based game. The gaming machine includes a credit input mechanism, a player interface, a display device, and a game controller. The credit input mechanism is configured to receive a physical item representing a monetary value. The player interface is configured to generate input signals representative of a move requested by a player of the gaming machine. The display device includes a plurality of display positions.

The game controller is configured to increase a credit balance of a credit meter based on the monetary value of the received physical item, and decrease the credit balance based on a wager. The game controller is further configured to determine, for each initial game state of a plurality of initial game states, a predetermined expected minimum payout that accounts for skill-based moves of a player, and assign weights to the plurality of initial game states based on respective predetermined expected minimum payouts of the plurality of initial game states and a desired minimum return-to-player. The game controller is also configured to randomly select an initial game state from a plurality of initial game states per the weights assigned to the plurality of initial game states, and display a plurality of symbols in the plurality of display positions per an initial symbol arrangement specified by the selected initial game state. The game controller is further configured to update one or more symbols in the plurality of display positions per the move represented by the input signals to obtain an updated plurality of symbols, and increase the credit balance based on an award associated with the updated plurality of symbols.

BRIEF DESCRIPTION OF THE DRAWINGS

In the drawings, various dimensions may be exaggerated for illustrative clarity. Additionally, like reference numbers are utilized to refer to like elements throughout the present disclosure.

FIG. 8 depicts a table of start screens and various predetermined characteristics of such start screens.

FIG. 9 depicts a table grouping valid start screens and weighting such start screens to obtain a desired return-to-player.

DETAILED DESCRIPTION

Figure 1:
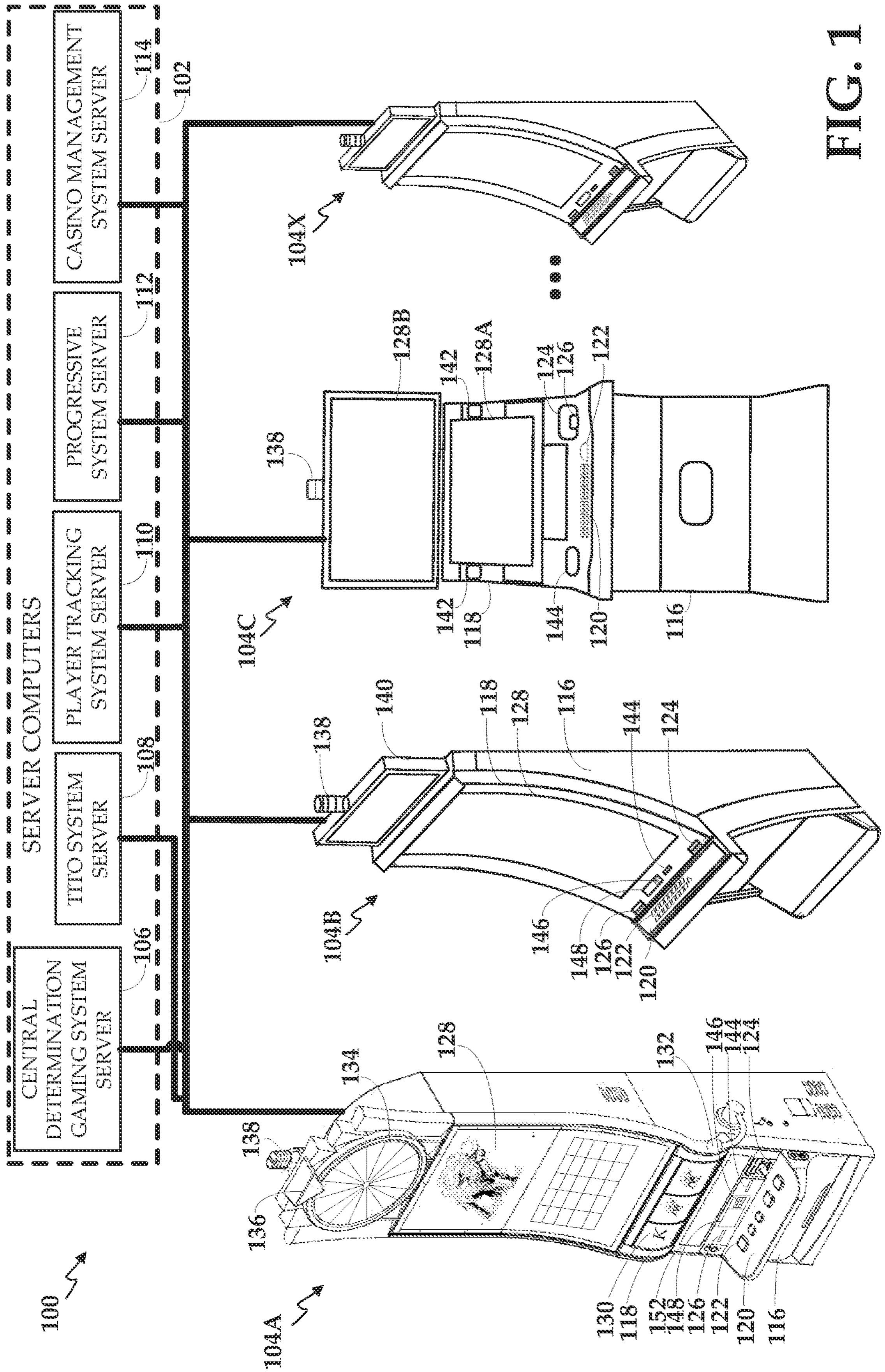
FIG. 1 depicts a gaming system in accordance with various aspects of the present disclosure.

Various aspects of the present disclosure are directed to electronic gaming systems and gaming machines for waging based on a skill-based game. In particular, the gaming machine provides a higher return-to-player to players who possess greater skill at the game than to players who possess lesser skill at the game. While the return-to-player may vary based on the skill of the player who is playing the game, the gaming machine is designed to ensure that the gaming machine provides at least a minimum return-to-player regardless of the skill-level of the players playing the game. Similarly, the gaming machine is designed to ensure that the gaming machine provides no more than a maximum return-to-player to ensure profitability for the operator of the gaming machine.

The various disclosed techniques for ensuring a gaming machine maintains a return-to-player between a desired minimum and a desired maximum may be applied to various different skill-based games. However, a particular skill-based game is described in order to clarify how the disclosed techniques may achieve the desired return-to-player. In particular, a skill-base games is described in which a player may swap adjacent symbols displayed in an array of display positions to form patterns of matching symbols. The gaming machine may provide an award of points, credits, etc. for the matching patterns. Moreover, the gaming machine may remove the symbols of the matching patterns thus creating vacated display positions. Symbols above the vacant display positions may fall or cascade down into the vacated display positions. Such cascading may result in the formation of further matching patterns, for which the gaming machine may provide additional awards. The gaming machine may further remove the symbols of the matching patterns formed due to the cascading, thus resulting in further cascading of symbols.

In some embodiments, the gaming machine may further display one or more box symbols, each having an associated numeric value. The gaming machine may reduce the numeric value of the box symbol when a matching pattern is formed adjacent to the box symbol. When the numeric value is reduced to a trigger value (e.g., zero), the gaming machine may provide a reward for the box symbol. The gaming machine may further remove the box symbol, thus resulting in the cascading or falling of symbols into the vacated display position.

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z."

As used herein, the singular forms are intended to include the plural forms as well, unless the context clearly indicates otherwise. The terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

Although the terms first, second, etc. may be used herein to describe various elements, these elements should not be limited by these terms. These terms are only used to distinguish one element from another element. Thus, for example, a first element, a first component, or a first section could be termed a second element, a second component, or a second section without departing from the teachings of the present disclosure. Similarly, various spatial terms, such as "upper," "lower," "side," and the like, may be used in distinguishing one element from another element in a relative manner. However, components can be oriented in different manners. For example, a component can be turned sideways so that its "top" surface is facing horizontally and its "side" surface is facing vertically, without departing from the teachings of the present disclosure.

FIG. 1 illustrates several different models of electronic gaming machines or electronic gaming machines (EGMs), which may be networked to various gaming related servers. Various embodiments of the present disclosure may be configured to work as a gaming system 100 that includes one or more server computers 102 (e.g., slot servers of a casino) that are in communication, via a communications network, with one or more gaming machines 104A-104X (EGMs, slots, video poker, bingo machines, etc.). The gaming machines 104A-104X may alternatively be portable and/or remote gaming machines such as, but not limited to, a smart phone, a tablet, a laptop, a game console, etc.

Communication between the gaming machines 104A-104X and the server computers 102, and among the gaming machines 104A-104X, may be direct or indirect, such as over the Internet through a website maintained by a computer on a remote server or over an online data network including commercial online service providers, Internet service providers, private networks, and the like. In other embodiments, the gaming machines 104A-104X may communicate with one another and/or the server computers 102 over RF, cable TV, satellite links, and the like.

In some embodiments, server computers 102 may not be necessary and/or preferred. For example, one or more embodiments of the present disclosure may be practiced on a stand-alone gaming machine such as gaming machine 104A, gaming machine 104B, or any of the other gaming machines 104C-104X. However, it is typical to find multiple EGMs connected to networks implemented with one or more of the different server computers 102 as described herein.

The server computers 102 may include a central determination gaming system server 106, a ticket-in-ticket-out (TITO) system server 108, a player tracking system server 110, a progressive system server 112, and/or a casino management system server 114. Gaming machines 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming machines 104A-104X that utilize the game outcomes and display the results to the players.

As depicted, the gaming machine 104A is of a cabinet construction. Moreover, the gaming machine 104A may be aligned in rows or banks of similar devices for placement and operation on a casino floor. The gaming machine 104A may include a main door 116, which provides access to the interior of the cabinet. Gaming machine 104A may also include a button area or button deck 120 accessible by a player. The button area or deck 120 may include input switches or buttons 122 of a player interface, an access channel for a bill validator 124, and/or an access channel for a ticket printer 126.

In FIG. 1, the gaming machine 104A is shown as a Relm XL™ model gaming machine manufactured by Aristocrat® Technologies, Inc. As shown, the gaming machine 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In some embodiments, the gaming machine 104A may have a main display 128 (e.g., video display monitor) mounted to, or above, the gaming display area 118. The main display 128 may include a high-resolution LCD, plasma, LED, and/or OLED panel, which may be flat or curved as shown. In some embodiment, the main display 128 may include a cathode ray tube, or other conventional electronically controlled video monitor.

In some embodiments, the bill validator 124 may also function as a "ticket-in" reader that allows the player to use a casino issued credit ticket to load credits onto the gaming machine 104A (e.g., in a cashless ticket ("TITO") system). In such cashless embodiments, the gaming machine 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming machine 104A.

In some embodiments, a player tracking card reader 144, a transceiver for wireless communication with a player's smart phone, a keypad 146, and/or an illuminated display 148 for reading, receiving, entering, and/or displaying player tracking information is provided in EGM 104A. In such embodiments, a game controller within the gaming machine 104A may communicate with the player tracking server system 110 to send and receive player tracking information.

The gaming machine 104A may also include a bonus topper wheel 134. When bonus play is triggered (e.g., by a player achieving a particular outcome or set of outcomes in the primary game), bonus topper wheel 134 may spin and stop with indicator arrow 136 to indicate the outcome of the bonus game. Bonus topper wheel 134 may used to play a bonus game, but the bonus topper wheel 134 may also be incorporated into play of the base or primary game.

A candle 138 may be mounted on the top of the gaming machine 104A and may be activated by a player (e.g., using a switch or button 122) to indicate to operations staff that gaming machine 104A has experienced a malfunction or the player requires service. The candle 138 may also be used to indicate a jackpot has been won and to alert staff that a hand payout of an award may be needed.

The gaming machine 104 may also include one or more information panels 152, which may be a back-lit, silkscreened glass panel with lettering to indicate general game information such as, for example, a game denomination (e.g., $0.25 or $1), pay lines, pay tables, and/or various game related graphics. In some embodiments, the information panel(s) 152 may be implemented as an additional video display.

The gaming machine 104A may further include a handle 132 of the player interface typically mounted to the side of main cabinet 116 which may be used to initiate game play.

Figure 2:
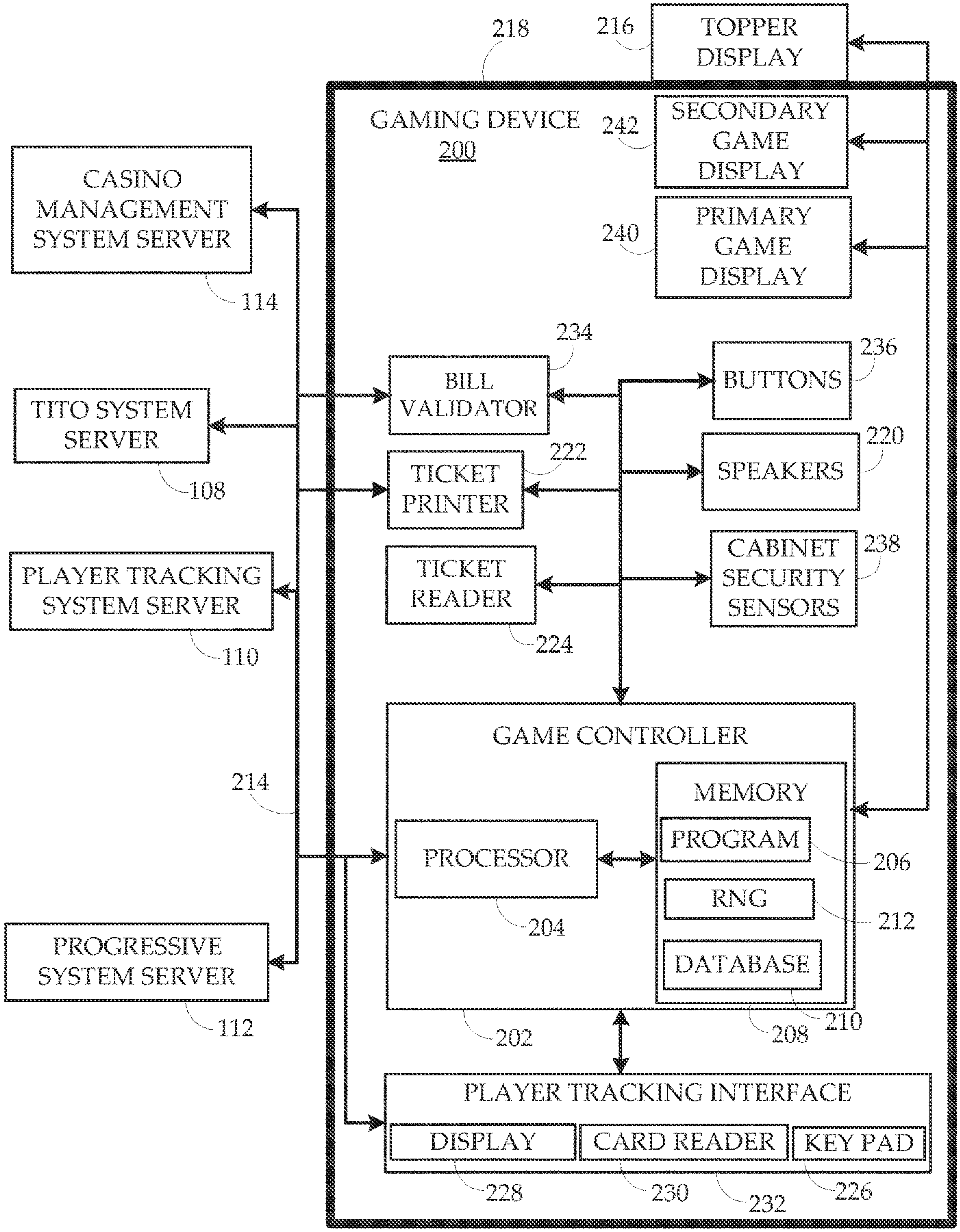
FIG. 2 depicts an exemplary gaming machine of the gaming system of FIG. 1.

Many or all the above described components may be controlled by circuitry (e.g., a gaming controller) housed inside the main cabinet 116 of the gaming machine 104A, the details of which are shown in FIG. 2.

Note that not all gaming machines suitable for implementing embodiments of the present disclosure necessarily include top wheels, top boxes, information panels, cashless ticket systems, and/or player tracking systems. Further, some suitable gaming machines have only a single game display that includes only a mechanical set of reels and/or a video display, while others are designed for bar counters or table tops and have displays that face upwards.

An alternative example gaming machine 104B illustrated in FIG. 1 is the Arc™ model gaming machine manufactured by Aristocrat® Technologies, Inc. Note that where possible, similar features of the gaming machines 104A, 104B are referenced using the same reference numbers. The gaming machine 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, the topper screen 140 may also or alternatively be used to display progressive jackpot prizes available to a player during play of gaming machine 104B.

The gaming machine 104B may include a main cabinet 116 including a main door 118, which opens to provide access to the interior of the gaming machine 104B. The main or service door 118 may be used by service personnel to refill the ticket-out printer 126 and collect bills and tickets inserted into the bill validator 124. The door 118 may also be used to reset the machine, verify and/or upgrade the software, and for general maintenance operations.

Another example gaming machine 104C shown is the Helix™ model gaming machine manufactured by Aristocrat® Technologies, Inc. The gaming machine 104C may include a main display 128A that is in a landscape orientation. Although not illustrated due to the provided front view, the landscape display 128A may have a curvature radius from top to bottom, or alternatively from side to side. In some embodiments, the display 128A may include a flat panel display. The main display 128A may be used for primary game play while the secondary display 128B may be used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming machines 104A-104C and other similar gaming machines. Each gaming machine 104A-104C may also be operable to provide many different games. Games may be differentiated according to themes, sounds, graphics, type of game (e.g., slot game vs. card game vs. game with aspects of skill), denomination, number of pay lines, maximum jackpot, progressive or non-progressive, bonus games, and may be deployed for operation in Class II or Class III gaming establishments.

FIG. 2 is a block diagram depicting exemplary internal electronic components of a gaming machine 200 connected to various external systems. All or parts of the example gaming machine 200 shown may be used to implement any one of the example gaming machines 104A-X depicted in FIG. 1. The games available for play on the gaming machine 200 are controlled by a game controller 202 that includes one or more processors 204 for executing instructions of game software or programs 206 stored in memory 208. The memory 208 may include one or more mass storage devices or media that are housed within gaming machine 200. Within the mass storage devices and/or memory 208, one or more databases 210 may be provided for use by the program 206.

The gaming machine 200 may further include random number generator (RNG) 212. The RNG 212 may be used to generate random numbers that are used in the operation of game play to ensure that game play outcomes are random and meet regulations for a game of chance. To this end, the RNG 212 may be implemented in hardware and/or software. Alternatively, a game instance (i.e. a play or round of the game) may be generated on a remote gaming machine such as a central determination gaming system server 106 (not shown in FIG. 2 but see FIG. 1). The game instance may be communicated to the gaming machine 200 via the network 214 and then displayed on gaming machine 200. The gaming machine 200 may execute game software, such as but not limited to video streaming software that allows the game to be displayed on the gaming machine 200. When a game is stored on the gaming machine 200, the game may be loaded from a memory 208 (e.g., from a read only memory (ROM)) or from the central determination gaming system server 106 to memory 208. The memory 208 may include RAM, ROM, or another form of storage media that stores instructions for execution by the processor 204.

The gaming machine 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming machine 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming machine 200 may further include a bill validator 234, buttons 236 of a player interface, cabinet security sensors 238 to detect unauthorized opening of the cabinet 218, a primary game display 240, and a secondary game display 242, each coupled to and operable under the control of game controller 202.

The gaming machine 200 may be connected over network 214 to player tracking system server 110. The player tracking system server 110 may be, for example, an OASIS® system manufactured by Aristocrat® Technologies, Inc. The player tracking system server 110 may be used to track play (e.g. amount wagered, games played, time of play, and/or other quantitative or qualitative measures) for individual players so that an operator may reward players in a loyalty program. The player may use the player tracking interface 232 to access his/her account information, activate free play, and/or request various information. The player tracking or loyalty programs seek to reward players for their play and help build brand loyalty to the gaming establishment. The rewards typically correspond to the player's level of patronage (e.g., to the player's playing frequency and/or total amount of game plays at a given casino). The player tracking rewards may include complimentary and/or discounted meals, lodging, entertainment, and/or additional play. The player tracking information may be combined with other information readily obtainable by a casino management system.

The gaming machines, such as gaming machines 104A-104X, 200, are highly regulated to ensure fairness and, in many cases, gaming machines 104A-104X, 200 are operable to award monetary awards (e.g., typically dispensed in the form of a redeemable voucher). Therefore, to satisfy security and regulatory requirements in a gaming environment, hardware and software architectures are implemented in gaming machines 104A-104X, 200 that differ significantly from those of general-purpose computers. Adapting general purpose computers to function as gaming machines 200 is not simple or straightforward because of: 1) the regulatory requirements for gaming machines 200, 2) the harsh environment in which gaming machines 200 operate, 3) security requirements, 4) fault tolerance requirements, and 5) the requirement for additional special purpose components to enable functionality of an EGM. These differences require substantial engineering effort with respect to game design implementation, hardware components, and/or software.

When a player wishes to play the gaming machine 200, he/she can insert cash or a ticket voucher through a coin acceptor (not shown) or bill validator 234 to establish a credit balance on the gamine machine. The credit balance may be used by the player to place wagers on instances of the game and to receive credit awards based on the outcome of winning instances. The gaming machine 200 may increase the credit balance by the amount of each wager and may increase the credit balance upon a win. The player may further add additional credits to the credit balance at any time. The player may also optionally insert a loyalty club card into the card reader 230. During the game, the player may view the game outcome on the game displays 240, 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or selecting various items during a feature game). The player may make these selections using the player-input buttons 236, the primary game display 240 which may include a touch screen and/or using some other device of a player interface which enables a player to input information into the gaming machine 200.

During certain game events, the gaming machine 200 may display visual and auditory effects that may be perceived by the player. These effects may add to the excitement of a game, which makes a player more likely to enjoy the playing experience. Auditory effects may include various sounds that are projected by the speakers 220. Visual effects may include flashing lights, strobing lights, and/or other patterns displayed from lights on the gaming machine 200 or from lights behind the information panel 152 (FIG. 1).

When the player is done, he/she may cash out the credit balance by, for example, pressing a cash out button to receive a ticket from the ticket printer 222. The ticket may be "cashed-in" for money or inserted into another machine to establish a credit balance for play.

Skill-Based Game

As explained in further detail below, the gaming machine 200 may implement a skill-based game in which the gaming machine 200 provides payouts that are influenced or otherwise affected by the skill of the person playing the game. However, state gaming commissions or other gaming regulatory authorities generally require that gaming machines such as gaming machine 200 maintain a minimum return-to-player (RTP). Thus, in order to satisfy such regulatory requirements, manufacturers are required to prove that the gaming machine 200 satisfies the return-to-player requirements set forth by the gaming regulatory authority.

Furthermore, while gaming regulatory authorities require gaming machines provide at least a specified minimum return-to-player, the casinos, hotels, and/or other gaming machine operators require assurances that the gaming machine does not payout more than a maximum return-to-player in order to ensure profitability. Thus, the gaming machine 200 of the present disclosure implements a skill-based game in a manner that provides a higher return-to-player to more skilled players and a lesser return-to-player to lesser skilled players while ensuring the return-to-player remains within a minimal return-to-player required by the gaming regulatory authority and a maximum return-to-player required by the gamine machine operator.

In the interest of better understanding how such return-to-player requirements may be maintained in a skill-based game, a specific skill-based game is presented in detail. However, the below-described process may be readily adapted for other skill-based games in order to maintain a desired return-to-player.

The example skill-based game may generally be considered a symbol matching game similar in concept to Candy Crush Saga released by King Digital Entertainment, PLC and/or Bejeweled released by PopCap Games, Inc. In such symbol matching games, the core gameplay is based on swapping two adjacent game symbols (e.g., candies, jewels, etc.) on the game board in an attempt to create predetermined patterns of matching game symbols. Upon creating a predetermined pattern of matching game symbols, hereinafter a "matching pattern," the matching pattern is removed from the game board, and other game symbols cascade or fall into the spaces or display positions vacated by the removed game symbols. Furthermore, new game symbols drop into the vacated display positions from the top of the game board. The falling game symbols may create a new matching patterns, which the gaming machine may remove in the same manner. Thus, a single swap of adjacent game symbols may create a series of several matching patterns in a serial and/or parallel fashion. Such a series of creating and removing matching patterns may be referred to as a chain reaction, a tumble, and/or a cascade win.

Figure 3:
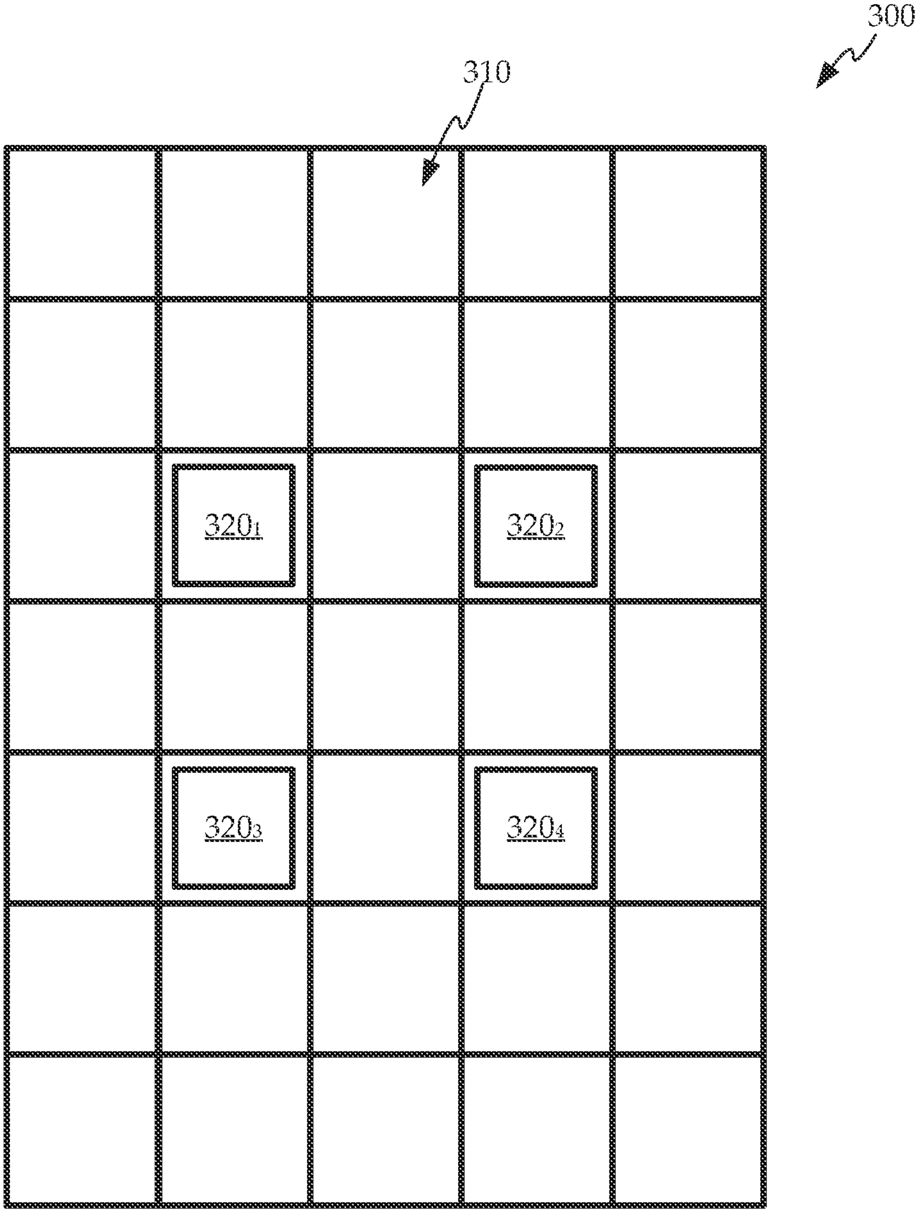
FIG. 3 depicts an exemplary game board for a skill-based game implemented by the gaming machine of FIG. 2.
Figure 4:
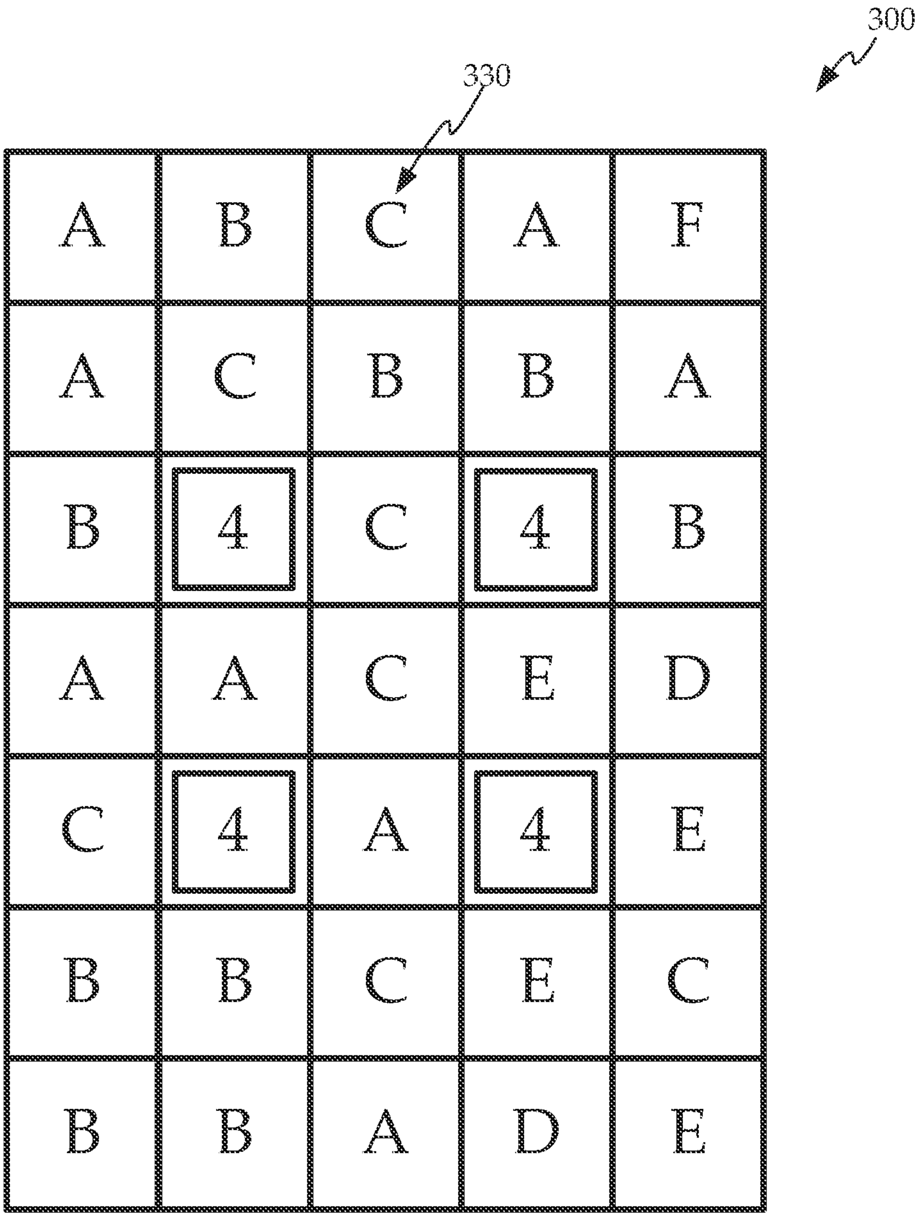
FIG. 4 depicts the exemplary game board of FIG. 3 populated per reel strips carrying an ordered symbol set and a selected reel stop position for such reel strips.
Figures 5, 6:
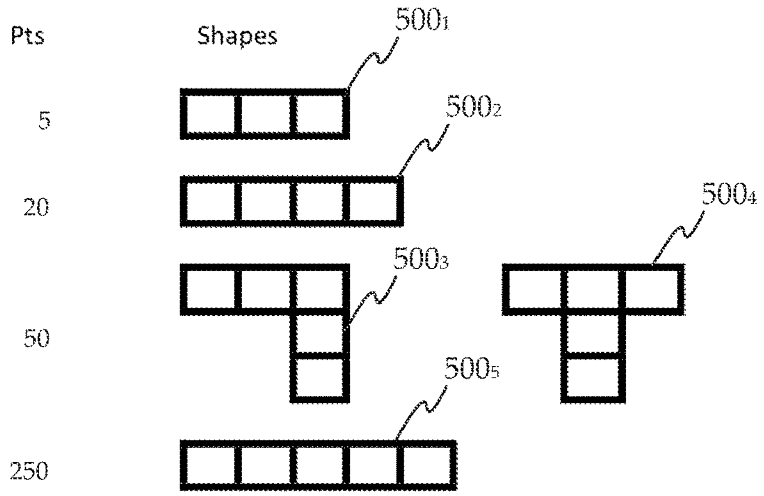
FIG. 5 depicts an exemplary pay table for matching patterns of symbols used in one embodiment of a skill-based game.
FIG. 6 depicts a reel set comprising reel strips carrying an ordered symbol set.

In one embodiment, a skill-based symbol matching game is played upon a game board 300 as shown in FIG. 3. The game board 300 may comprise a 5×7 array of thirty-five symbol display positions 310. The game board 300 may be pre-populated with four box or box symbols $\mathbf{320}_1$, $\mathbf{320}_2$, $\mathbf{320}_3$, $\mathbf{320}_4$ each having an associated initial numeric value (e.g., four). Upon initiating play, the gaming machine 200 may populate the remaining thirty-one display positions 310 with game symbols 330 as shown in FIG. 4. At which point, the player may begin to swap game symbols 330 in an attempt to form one or more matching patterns. Example matching patterns $\mathbf{500}_1$-$\mathbf{500}_5$ and associated awards are shown in FIG. 5.

In some embodiments, the gaming machine 200 implements the skill-based game per the following:

- The player starts the game with an allotted number of turns or moves (e.g. three turns).

- The game board is initially populated with a valid start screen of game symbols.
- A valid start screen includes no matching patterns, but at least one valid move.
- A valid move comprises swapping adjacent symbols to form a matching pattern.
- Invalid moves such as swapping non-adjacent symbols or swapping adjacent symbols that fail to form a matching pattern are either ignored or undone to retain the game board in the state prior to the invalid move.
- Matching patterns are removed and replaced with game symbols that fall or cascade down from populated display positions above the vacated display positions.
- Each box symbol has an associated initial numeric value (e.g., four) that is reduced when a matching pattern is formed adjacent the respective box symbol.
- Removing a matching pattern that is adjacent a box symbol only decreases the numeric value of the box symbol once even if the matching pattern includes multiple game symbols adjacent the box symbol.
- A box symbol is removed from the game board when its numeric value reaches a predetermined trigger value (e.g., zero).
- When populating the game board, game symbols fall or cascade past a box symbol to fill vacated display positions below the box symbol.
- Cascade wins may occur from the formation of additional matching patterns resulting from game symbols falling or cascading down to replace removed game symbols.
- Additional matching patterns of cascade wins may further reduce the numeric value of a box symbol if formed adjacent the box symbol.
- When the numeric value of a box symbol is reduced to a predetermined trigger value (e.g. zero), a prize (e.g., additional credits) is awarded and the box symbol is removed to form a vacated display position to be filled by game symbols cascading from above.
- If all box symbols are removed before the player has performed their allotted moves, the game board is cleared and repopulated with a new valid start screen comprising game symbols and four box symbols at the initial numeric value (e.g., four).
- If the game board includes no valid moves, the game board is cleared and repopulated with a new screen that retains any existing box symbols with their current numeric values and that includes new selected game symbols comprising no matching patterns but at least one valid move.
- The skill-based game ends after the player has performed their allotted number of moves.

The game symbols 330 used to populate the game board 300 may be selected from a predetermined set of different symbols. For example, FIGS. 4 and 6 depict a set of seven different game symbols 330, which are represented by different letters (e.g. A, B, C, D, E, F, G) for ease of illustration. However, other embodiments of the skill-based game may utilize a different number of game symbols. Moreover, the game symbols 330 may take on other shapes, such as for example, different gems (e.g., diamonds, rubies, etc.); different cookies (e.g., sandwich, chocolate chip, etc.); different candies (e.g., candy corn, gum ball, etc.) that may align with a particular theme of the gaming machine 200.

Similarly, the box symbols $320_1$-$320_4$ are depicted in FIGS. 3 and 4 as a simple rectangular symbol for ease of illustration. However, each of the box symbols $320_1$-$320_4$ may take on another shape such as a treasure chest, a cookie jar, a candy jar, etc. that may align with a particular theme of the gaming machine 200 and/or the game symbols 330. As further shown, in FIG. 4, each box symbols $320_1$-$320_4$ may further include an associated numeric value (e.g., four), which may be presented to the player. As explained below, the numeric value may specify the number of times the respective box symbol $320_1$-$320_4$ must be hit or otherwise activated before the box symbol $320_1$-$320_4$ is removed from the game board 300.

The player may exercise skill in creating matching patterns on the game board 300. In particular, the player may create matching patterns by swapping game symbols 330 that are positioned side-by-side. In some embodiments, the gaming machine 200 may permit the player to swap two game symbols 330 that are in orthogonally adjacent display positions of the game board 300, but not diagonally adjacent display positions of the game board 300.

The gaming machine 200 may award the player based on which matching patterns are formed. Referring to FIG. 5, five different matching patterns $500_1$-$500_5$ are shown. Each pattern $500_1$-$500_5$ may be associated with a payout of points or credits. For example, the gaming machine 200 may award 5 points for forming matching pattern $500_1$, which corresponds to a horizontal or vertical line of three matching game symbols 330. Moreover, the gaming machine 200 may award 20 points for forming matching pattern $500_2$, which corresponds to a horizontal or vertical line of four matching game symbols 330. As shown, the gaming machine 200 may award of 50 points for matching patterns $500_3$ and $500_4$ and may award 200 points for matching pattern $500_5$. The matching patterns $500_1$-$500_5$ are depicted in FIG. 5 in a base orientation corresponding to a rotation of 0°. The gaming machine 200 may award game symbols 330 that form the matching patterns $500_1$-$500_5$ of FIG. 5 in the base orientation or rotated by 90°, 180°, and/or 270° from the base orientation.

As noted above, the gaming machine 200 may populate the game board 300 with game symbols 330. In one embodiment, the gaming machine 200 may populate the game board 330 based upon a reel set 600 comprising predefined reel strips such as reel strips $610_1$-$610_5$ shown in FIG. 6. Each reel strip $610_1$-$610_5$ may include an ordered symbol set consisting of a fixed number of game symbols 330 in a predefined order. In some embodiments, each reel strip $610_1$-$610_5$ may include the same fixed number of game symbols 330. However, in the depicted embodiment, each reel strip $610_1$-$610_5$ may provide an ordered symbol set having a different fixed number of game symbols 330. The particular ordered symbol set of each reel strip $610_1$-$610_5$ is predetermined or predefined. Moreover, the gaming machine 200 may include multiple reel sets, wherein each reel set may comprise a different number of reel strips, carry different game symbols, specify a different order of game symbols, etc. Furthermore, while the reel strips $610_1$-$610_5$ are depicted as a linear set of symbols, the game machine 200 utilizes the reel strips $610_1$-$610_5$ in a circular manner such that first reel stop (e.g., reel stop 0 of reel strip $610_1$) is adjacent to the last reel stop (e.g., reel stop 16 of reel strip $610_1$).

As explained further below, the gaming machine 200 may use the reel set 600 to populate the game board 300 with game symbols 330. Furthermore, the gaming machine 200 may also use the reel set 600 to fill or cascade vacated display positions 310 of the game board 300 in a predefined manner. As such, a minimum expected value, a mean expected value, a maximum expected value, and/or other characteristics of interest may be predetermined for each reel stop position that specifies a valid start screen. Furthermore, a minimum return-to-player as well as a maximum return-to-player may be enforced by preselecting a subset of the valid start screens from which the gaming machine 200 may select and/or specifying the likelihood of a particular valid start screen being selected.

Figure 7A:
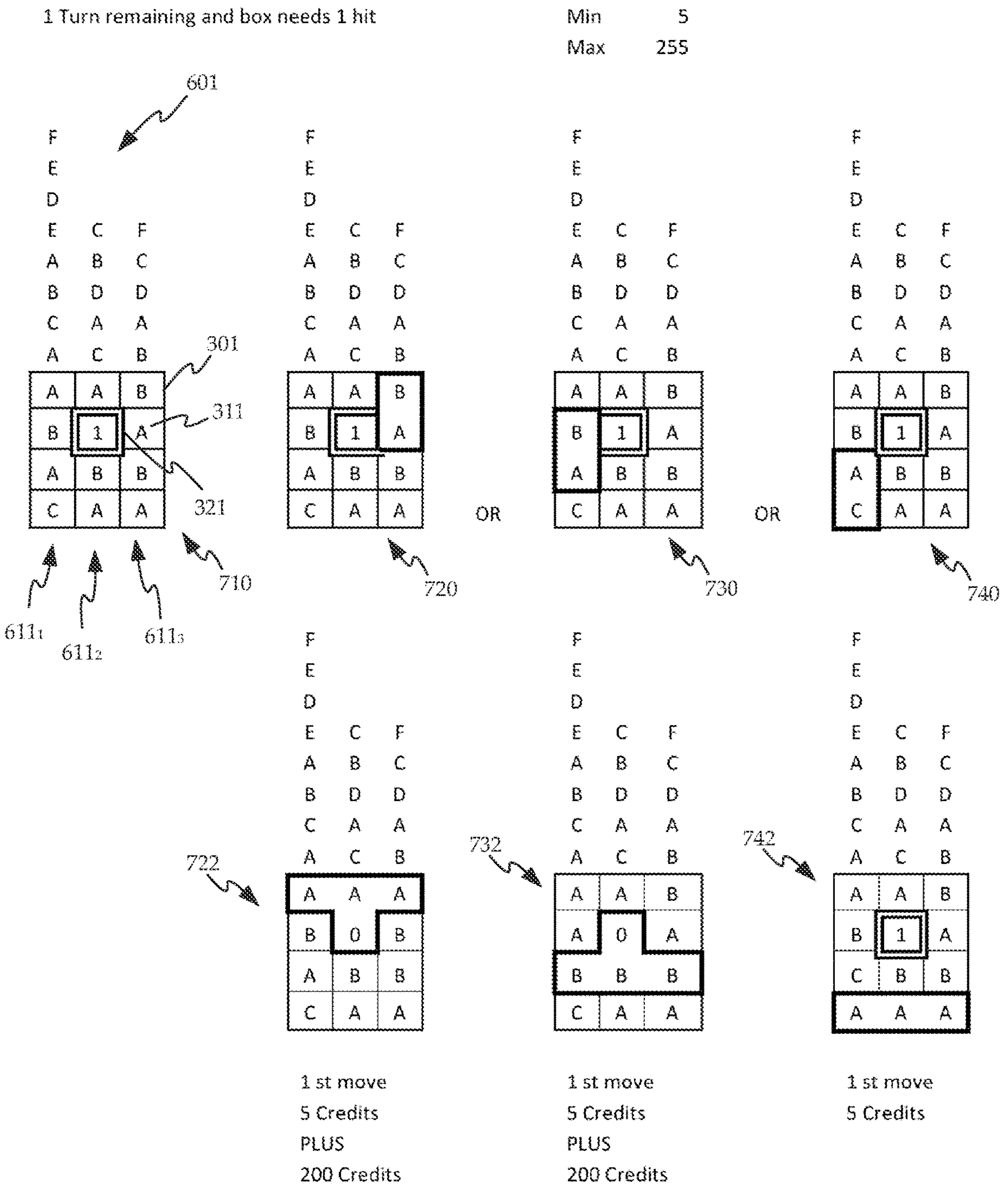
FIGS. 7A and 7B depict all possible moves of a particular start screen and the payouts resulting from such moves.
Figure 7B:
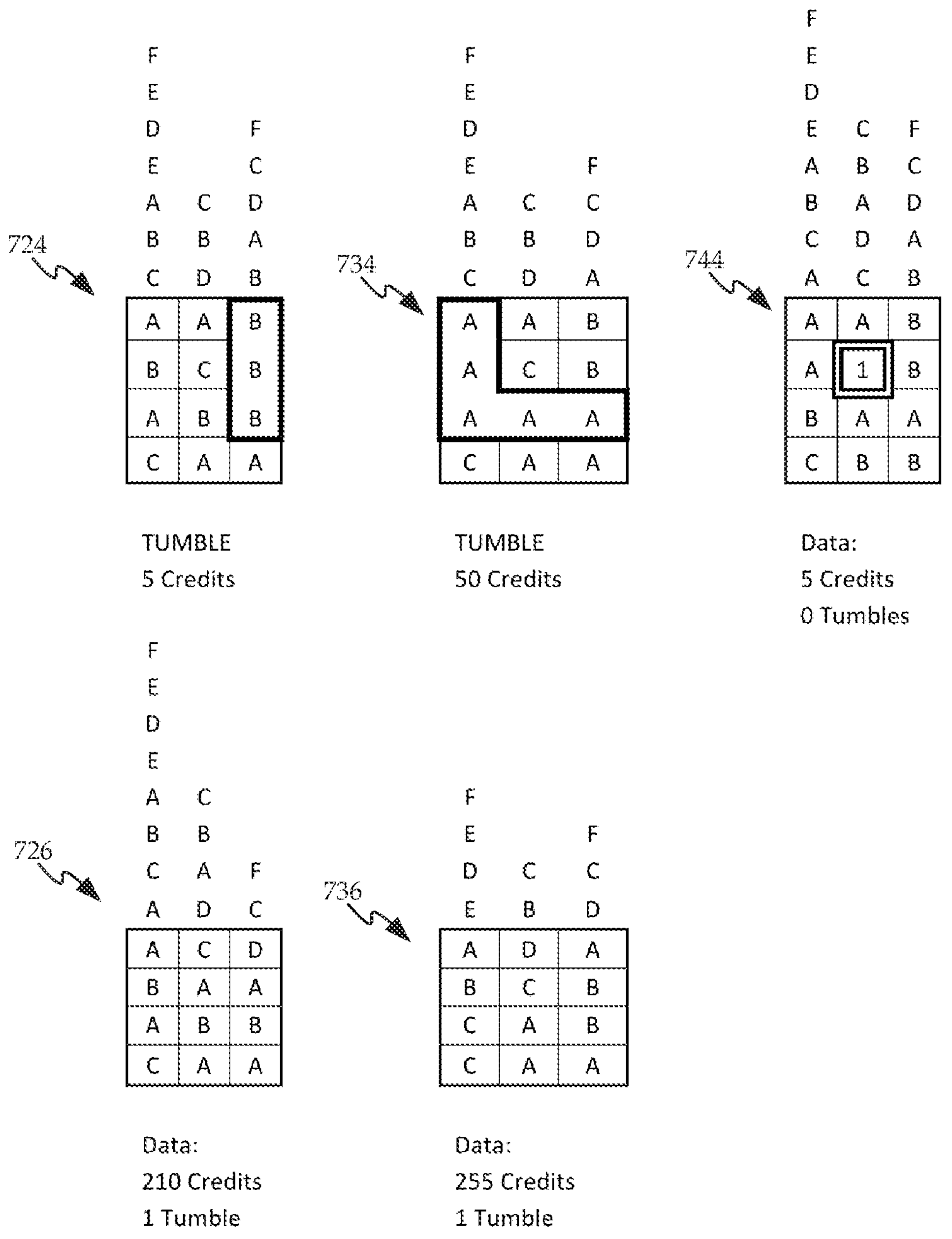
Figure 13:
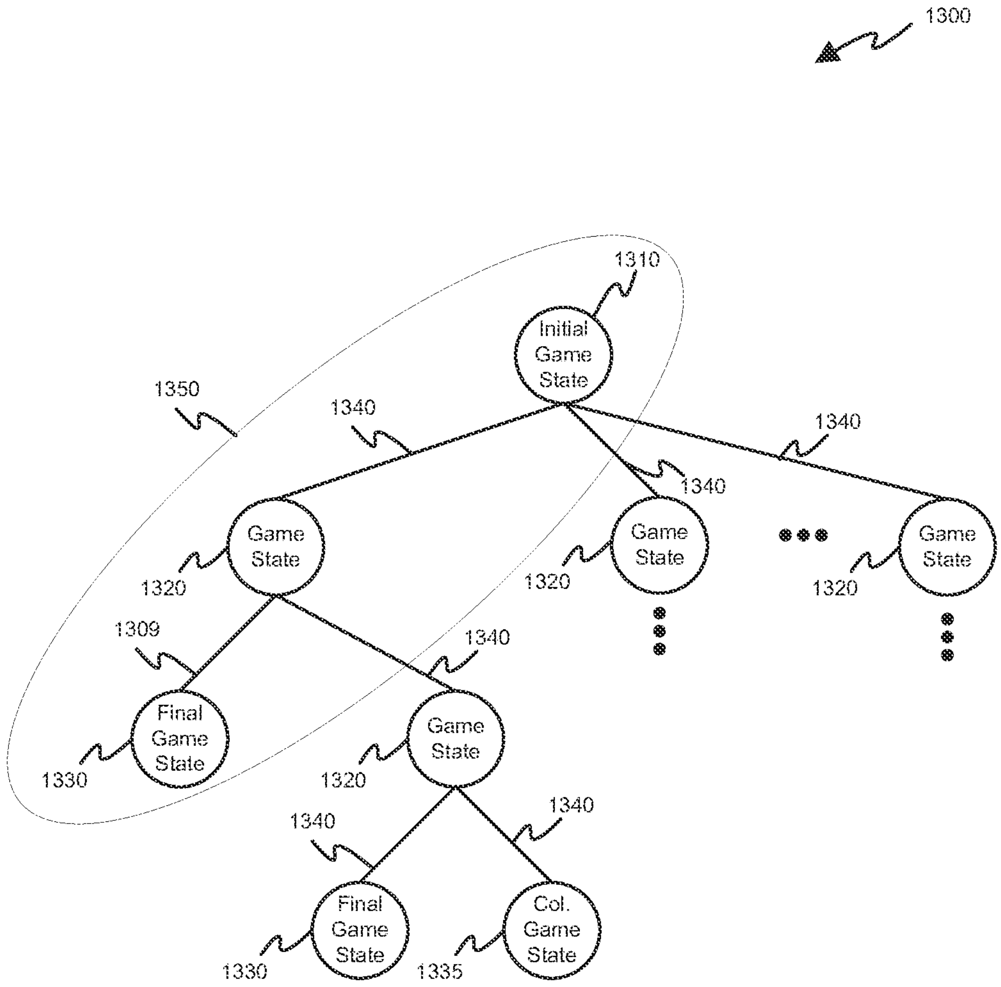
FIG. 13 depicts an exemplary decision tree which may be constructed and/or traversed by the gaming machine of FIG. 2 and/or the computing device of FIG. 12.

To better understand how return-to-player and other characteristics may be predetermined for each valid start screen, reference is now made to FIGS. 7A and 7B, which depict a simplified embodiment of the above-described skill-based game, and FIG. 13 which depicts a decision tree 1300 representative of all possible outcomes of a valid start screen or initial game state. In particular, the simplified embodiment of FIGS. 7A and 7B uses a smaller game board 301 comprising an 3×4 array of display positions 311, a reel set 601 comprising three reel strips $\mathbf{611_1}$-$\mathbf{611_3}$, and a single box symbol 321 with an initial numeric value of two. The simplified embodiment greatly reduces the number of possibilities, thus making it easier to explain the process for predetermining expected payouts and other aspects of a valid starting screen as specified by a reel stop position.

As explained in greater detail below with respect to the method 1000 of FIG. 10, a computing device 1200 may construct and/or traverse a decision tree 1300 (FIG. 13) for each initial game state or valid start screen. Each decision tree 1300 may represent all possible outcomes of its associated game state and the decisions or choices that lead to such possible outcomes. As such, the computing device 1200 may analyze each decision tree 1300 to obtain and record various aspects of each game state and its possible outcome.

In such an embodiment, each root node 1310, intermediary node 1320, and leaf node 1330 of the decision tree 1300 may correspond to a game state that may be achieved from the initial game state via a series of choices. In particular, each initial game state may correspond to a root node 1310 of its decision tree 1300. Each intermediary node 1320 may correspond to an intermediary game state (i.e., a game state that is not an initial game state or a final game state). Each leaf node 1330 may represent a final game state or game outcome that may be achieved by making a series of choices starting from the initial game state or root node 1310. Finally, each edge 1340 between a parent node (e.g. root node 1310 or intermediary node 1320) and a child node (e.g., an intermediary node 1320, leaf node 1330, and collective leaf node 1335 discussed below) may represent a choice that alters the game state of the parent node to obtain the game state of the child node.

Each leaf node 1330 corresponds to a branch 1350 of the decision tree 1300. In particular, each branch 1350 runs from the root node 1310 to a leaf node 1330 via edges 1340. The edges 1340 of a branch 1350 represent a series a choices made during the course of play of the skill-based game to achieve the game state represented by its respective leaf node 1330. Thus, the decision tree 1300 may contain a separate branch 1350 for each leaf node 1330.

A skill-based game may further include various events that alter the game state. For example, an exemplary skill-based game may include respins that randomly select a new game state from a plurality of game states. Such events, however, may provide a relatively large number of possible transitions to a similarly large number of possible game states (e.g., tens of thousands, hundreds of thousands, etc.). While theoretically possible to construct and/or traverse a decision tree 1300 which accounts for each of these possible transitions and game states, the resulting decision tree 1300 may be too large for a computing device 1200 to realistically analyze. For example, the resulting decision tree 1300 may take too long (e.g., many months or even many years) for the computing device 1200 to analyze. As explained in greater detail below, such game states may be represented by a collective leaf node 1335. In particular, the collective leaf node 1335 may collectively represent a group of possible game states (e.g., possibly tens, hundreds, thousands, or even more game states) and various determined characteristics of such game states.

Referring now to FIGS. 7A-7B, all possible moves and results of the skill-based game are depicted for a certain starting screen, in which (i) the box symbol 321 needs one more hit to trigger a payout, and (ii) the player has only one move remaining. In particular, FIG. 7A at 710 shows the game board 301 with the box symbol 321 needing one more hit and the display positions 311 filled with game symbols 330 specified by reel stop position (0, 0, 0) for reel strips $\mathbf{611_1}$-$\mathbf{611_3}$. From the game state of 710 (e.g., a root node 1310), three valid moves are possible. The player may swap the upper-right B and A symbols as shown at 720, the left B and A symbols as shown at 730, or the lower-left A and C symbols as shown at 740. If the player swaps the upper-right B and A symbols of 720, a matching pattern comprising a horizontal row of A symbols is formed as shown at 722. Such formation results in the numeric value of the box symbol 321 being reduced to zero. The player receives an award of 5 credits for the matching pattern and 200 credits for the triggered box symbol 321.

As shown at 724 of FIG. 7B, the matching pattern and box symbol 321 are removed and game symbols 330 from reel strips $\mathbf{611_1}$-$\mathbf{611_3}$ fill the vacated display positions per the order specified by the reel strips $\mathbf{611_1}$-$\mathbf{611_3}$. Thus, the reel stop position (0, 0, 0) not only specifies the game symbols 330 for the initial game board 301 at 710, but also specifies a fixed or known ordered symbol set of game symbols 330 for filling vacant display positions 311. As shown, an A symbol from the first reel strip $\mathbf{611_1}$ drops or cascades into the vacated display position 311 of the first column. Similarly, C and A symbols from the second reel strip $\mathbf{611_2}$ drop or cascade into the two vacated display positions of the second column. Furthermore, a B symbol from the third reel strip $\mathbf{611_3}$ drops or cascades into the vacated display position of the third column. As further shown at 724, the new B symbol from the third reel strip $\mathbf{611_3}$ forms a matching pattern comprising a vertical row of B symbols. Thus, the swap of symbols not only results in an award of 205 credits as shown at 722 but also an additional award of 5 credits for the chain-reaction, tumble, or cascade win for the matching pattern of 724.

As shown at 726, the matching pattern is removed and game symbols 330 from the third reel strip $\mathbf{611_3}$ fill the vacated display positions per the order specified by the third reel strips $\mathbf{611_3}$. In particular, B, A, and D symbol from the third reel strip $\mathbf{611_3}$ drop or cascade into the vacated display positions of the third column to obtain the game board 301 shown at 726. Such filling of the third column does not result in further matching patterns. Thus, the single move or swap of the upper-right B and A symbols resulted in an award of 210 credits including one tumble win and the game state 726. In light of the above, a decision tree 1300 for the reel stop position (0, 0, 0) may include a root node 1310 for the initial game state 710, a first leaf node 1330 for the final game state 726, and a first edge 1340 that represents the swap of the upper-right B and A symbols and that connects the root node 1310 to the first leaf node 1330.

If the player swaps the left B and A symbols as shown at 730 of FIG. 7A, a matching pattern comprising a horizontal row of B symbols is formed as shown at 732. Such formation results in the numeric value of the box symbol 321 being reduced to zero. The player receives an award of 5 credits for the matching pattern at 732 and 200 credits for the triggered box symbol 321.

As shown at 734 of FIG. 7B, the matching pattern and box symbol 321 are removed and game symbols 330 from reel strips 611$_1$-611$_3$ fill the vacated display positions 311 per the order specified by the reel strips 611$_1$-611$_3$. As shown, two A symbols of the first column along with an A symbol from the first reel strip 611$_1$ drop or cascade into the vacated display position 311 of the first column. Similarly, an A symbol of the second column along with C and A symbols from the second reel strip 611$_2$ drop or cascade into the two vacated display positions 311 of the second column. Furthermore, A and B symbols of the third column along with a B symbol from the third reel strip 611$_3$ drop or cascade into the vacated display position 311 of the third column. As further shown at 734, the dropped symbols form a matching pattern comprising a five A symbols. Thus, the swap of symbols not only results in an award of 205 credits as shown at 732 but also an additional award of 50 credits for the chain-reaction, tumble, or cascade win for the matching pattern of 734.

As shown at 736, the matching pattern is removed and game symbols 330 from the reel strip 611$_1$-611$_3$ fill the vacated display positions per the order specified by the reel strips 611$_1$-611$_3$. In particular, C, B, and A symbol from the first reel strip 611$_1$ drop or cascade into the three vacated display positions of the first column. Moreover, C and A symbols of the second column along with a D symbols from the second reel 611$_2$ drop or cascade into the vacated display position of the second column. Finally, two B symbols of the third column along with an A symbol of the third reel strip 611$_3$ drop or cascade into the vacated display position of the third column. Such filling of the columns does not result in further matching patterns. Thus, the single move or swap of the left B and A symbols resulted in an award of 255 credits including one tumble win. In light of the above, the decision tree 1300 for the reel stop position (0, 0, 0) may further include a second leaf node 1330 for the final game state 736, and a second edge 1340 that represents the swap of the left B and A symbols and that connects the root node 1310 to the second leaf node 1330.

If the player swaps the lower-left A and C symbols as shown at 740 of FIG. 7A, a matching pattern comprising a horizontal row of A symbols is formed as shown at 742. Such formation does not result in the numeric value of the box symbol 321 being updated since the matching pattern is not adjacent to the box symbol 321. As such, the player receives only an award of 5 credits for the matching pattern at 742.

As shown at 744, the matching pattern is removed and game symbols 330 from reel strips 611$_1$-611$_3$ fill the vacated display positions per the order specified by the reel strips 611$_1$-611$_3$. As shown, C, B, and A symbols of the first column along with an A symbol from the first reel strip 611$_1$ drop or cascade into the vacated display position 311 of the first column. Similarly, B and A symbols of the second column along with a C symbol from the second reel strip 611$_2$ drop or cascade into the two vacated display positions 311 of the second column. Of note, the A symbol of the second column drops or cascades past the box symbol 321 to fill a vacated display position 311 below the box symbol 321. Furthermore, B, A, and B symbols of the third column along with a B symbol from the third reel strip 611$_3$ drop or cascade into the vacated display position 311 of the third column. Such filling of the columns does not result in further matching patterns. Thus, the single move or swap of the lower-left A and C symbols of 740 resulted in an award of 5 credits with no tumble wins. In light of the above, the decision tree 1300 for the reel stop position (0, 0, 0) may further include a third leaf node 1330 for the final game state 744, and a third edge 1340 that represents the swap of the lower-left A and C symbols and that connects the root node 1310 to the third leaf node 1330.

From the above, reel stop position (0, 0, 0) with a box symbol 321 having a numeric value of one has a minimum payout of 5 credits, a maximum payout of 255 credits, and an average payout of 157 credits. Moreover, the reel stop position (0, 0, 0) may be represented by a decision tree 1300 having a root node 1310, a first edge 1340 to a first leaf node 1330 for game state 726, a second edge 1340 to a second leaf node 1330 for game state 736, and a third edge 1340 to a third leaf node 1330 for game state 744. Further characteristics of such reel stop position and box symbol configuration may also be predetermined. For example, reel stop position (0, 0, 0) with a box symbol 321 having a numeric value of one provides the player with three possible moves, 0.66 tumbles on average, 0.66 box hits on average, and 0.66 box trigger payouts on average.

In one embodiment, the above process is repeated for all permutations of reel stop positions (e.g., (0, 0, 0), (0, 0, 1), (0, 0, 2), etc.) with a box symbol 321 having a numeric value of one and the player having one move remaining in order to (i) predetermine which reel stop positions specify legal start screens (i.e., a starting screen with no matching patterns, but at least one valid move); and (ii) predetermine statistical information (e.g., minimum payout, maximum payout, etc.) for each legal start screen. From such gathered statistical information, the average minimum payout as well as the average maximum payout may be determined for all valid screens with the box symbol 321 needing one hit and the player having one move remaining.

As noted above, if a player has allotted moves remaining and the game board 300 includes no legal moves, then the gaming machine 200 repopulates the game board 300, but retains the existing box symbols 321. Similarly, if a player has allotted moves remaining and the game board 300 includes no box symbols 321, then the gaming machine 200 repopulates the game board 300 with game symbols 330 and newly initialized box symbols 321. Such repopulations may be referred to as respins since such repopulations may be accomplished by randomly selecting a new reel stop position for each of the reel strips and filling the game board 300 based on the reel strips and the new reel stop position, thus effectively respinning virtual reels carrying the reel strips.

If the player has only one move remaining, a player's move cannot result in a "respin" since the player after making the move has no moves remaining. Conversely, if the player has two or more moves remaining, then a player's move may result in a game board 301 having no legal moves and/or no box symbol 321 while the player still has remaining moves. In order to maintain a desired return-to-player, the expected value of such "respins" are predetermined and predefined. To this end, the above process may be used and repeated to obtain the average or expected minimum payout as well as the average or expected maximum payout for the following game states:

- Player has one move remaining and the box symbol 321 needs two hits.
- Player has one move remaining and the box symbol 321 needs one hit.
- Player has two moves remaining and the box symbol 321 needs two hits.

Player has two moves remaining and the box symbol 321 needs one hit.

Player has three moves remaining and the box symbol 321 needs two hits.

Note, this last game state corresponds to the initial or starting screen for the simplified embodiment.

When determining the expected minimum and maximum payouts for the situation where the player has two moves remaining and the box symbol needs two hits, a process similar to the one shown in FIGS. 7A and 7B may be used to ascertain the payout of each valid screen having a box symbol needing two hits. However, during such process some moves may result in a game board 301 requiring a respin. For example, a move may result in a game board 301 in which the box symbol 321 still needs one hit, there are no valid moves, and the player has one move remaining. Accordingly, the expected minimum and maximum payouts for one move remaining with the box symbol 321 may be determined before starting or otherwise proceeding. Thus, the expected minimum and maximum payout of respinning when the player has one move remaining and the box symbol 321 needs one hit may be predetermined or known when determining the situations where the player has two moves remaining.

For example, the reel strips 611$_1$-611$_3$ may be predetermined to provide an average minimum payout of 5 credits and an average maximum payout of 150 credits when the player has one move remaining and the box symbol 321 requires one hit to trigger its payout. Thus, if a move leading to a respin provides a payout of 5 credits, a player has one move remaining, and the box symbol 321 needs one hit, then that move has an overall expected average minimum payout of 10 credits (its 5 credit payout plus the expected average minimum payout of 5 credits for the respin) and an expected average maximum payout of 155 credits (its 5 credit payout plus the expected average maximum payout of 150 credits for the respin).

Such collective aspects resulting from a respin when a player has one move remaining, and the box symbol 321 need one hit may be represented by a collective leaf node 1335. In particular, the collective leaf node 1335 may have the above associated characteristics, namely, the expected average minimum payout of 5 credits for such a respin, the expected average maximum payout of 150 credits for such a respin, as well as possibly other characteristics for such a respin (e.g., average number of tumbles, the average number of choices or possible moves, etc.). In view of such predetermined aspects, the collective leaf node 1335 may be connected to any intermediary node 1320 in a respective decision tree 1300 that corresponds to a game state in which a player has one move remaining, and the box symbol 321 needs one hit. More specifically, an edge 1340, representative of respin event, may connect such nodes. In this manner, a computing device 1200 may traverse, construct, and/or analyze the decision tree 1300 to ascertain the expected average minimum payout, the expected average maximum payout, as well as other characteristics of branches 1350 that include a collective leaf node 1335.

Using the above process, a table 800 of expected payouts and other characteristics may be developed for the reel set 600 of FIG. 6. Only a small subset of the roughly one million possible start screens are shown in FIG. 8. For each possible reel stop position, the table 800 may include the expected minimum payout (MinVal), the expected maximum payout (MaxVal), the expected average payout (MeanVal), the number of tumbles, the number of choices or possible moves, and/or other statistical information that may aid a designer in selecting a subset of reel stop positions or starting screens. Of note, certain reel stop positions specify an invalid start screen (e.g., a game board 300 having no valid move and/or having a matching pattern). For such reel stop positions, the table 800 provides n/a (not applicable) values in the respective columns. See, e.g., the table row for reel stop (0, 0, 0, 0, 4). However, in other embodiments, rows for invalid start screens may simply be dropped or otherwise not included in the table 800.

Referring now to FIG. 9, a game designer and/or computing device 1200 may analyze the data of table 800 and create a table 900 of valid start screens (i.e., reel stop positions or initial game states) for a given skill-based game implementation. The table 900 of FIG. 9 provides only a representative subset of all rows. As shown, the table 900 may group multiple reel positions together based on their minimum payout. For example, the table 900 includes a row for the 414,843 different reel stop positions having a minimum payout of 15 credits, and another row for the 49,964 different reel stop positions having a minimum payout of 20 credits.

As further shown, a game designer and/or computing device 1200 may assign a weight to each row of the table 900, thereby specifying the odds of selecting a reel stop position of the row to populate the game board 300. As shown, the game designer and/or computing device 1200 may assign greater, non-zero weights to certain rows than to other rows in order to increase the odds of certain reel stop positions being selected. For example, the 880 minimum payout row has a weight of one, whereas the 1020 minimum payout row has an assigned weight of ten. As such, each of the 30 different reel stop positions having a minimum payout of 1020 credits are ten times more likely to be selected than the one reel stop position having a minimum payout of 880 credits.

Moreover, the game designer and/or computing device 1200 may assign a weight of zero to a row, which effectively excludes the reel stop positions of such row from being selected. Thus, in the example table 900, the 414,843 different reel stop positions having a minimum payout of 15 credits, and the 49,964 different reel stop positions having a minimum payout of 20 credits are excluded due to their assigned zero weight. Via such zero weights, the game designer and/or computing device 1200 in the depicted example has specified a skill-based game that utilizes only 1,382 of the 480,308 valid initial screens. Furthermore, via the non-zero weights assigned to the 1,382 initial screens, the game designer and/or computing device 1200 has obtained a weighted, average minimum payout of roughly 978 credits and a weighted, average maximum payout of roughly 1206 credits. If the gaming machine 200 collects 1220 credits on average per play of the skill-based game, then the gaming machine 200 would maintain a minimum return-to-player of roughly 80% and a maximum return-to-player of roughly 98%. Thus, per the above process, a game designer and/or computing device 1200 can design a skill-based game that maintains a desired minimum return-to-player and a desired maximum return-to-player while providing more-skilled players with a higher return-to-player than lesser-skilled players.

As noted, the table 900 groups reel stop positions together by their minimum payout. Such grouping of reel stop positions may aid the game designer and/or computing device 1200, by reducing the number of rows to be assessed. For example, in one embodiment, a reel set may specify 796,600 different screens of which 480,308 are valid start screens. Grouping the 480,308 different start screens based on a minimum payout may result in a table having a much small number of rows (e.g., 76 rows). Assigning weights to the much smaller number of rows results in a much more manageable task for the game designer and/or computing device 1200.

Furthermore, while table 900 provides a coarse grouping of reel stop positions based on minimum payout, the reel stop positions may be grouped based on a finer grouping. For example, the reel stop positions may be further grouped based on the number of tumbles, the number of presented player choices, the number of box hits, etc. Such aspects may not affect the return-to-player of the game, but may affect the enjoyment of the game. For example, players may find a game with many tumbles more exciting than a game with few tumbles even if the two games provide the same payout. By grouping the reel stop positions based on such additional criteria, the game designer and/or computing device 1200 may not only select and weight reel stop positions based on return-to-player requirements, but may further select and weight reel stop positions such that the "exciting" screens occur more often.

Figure 10:
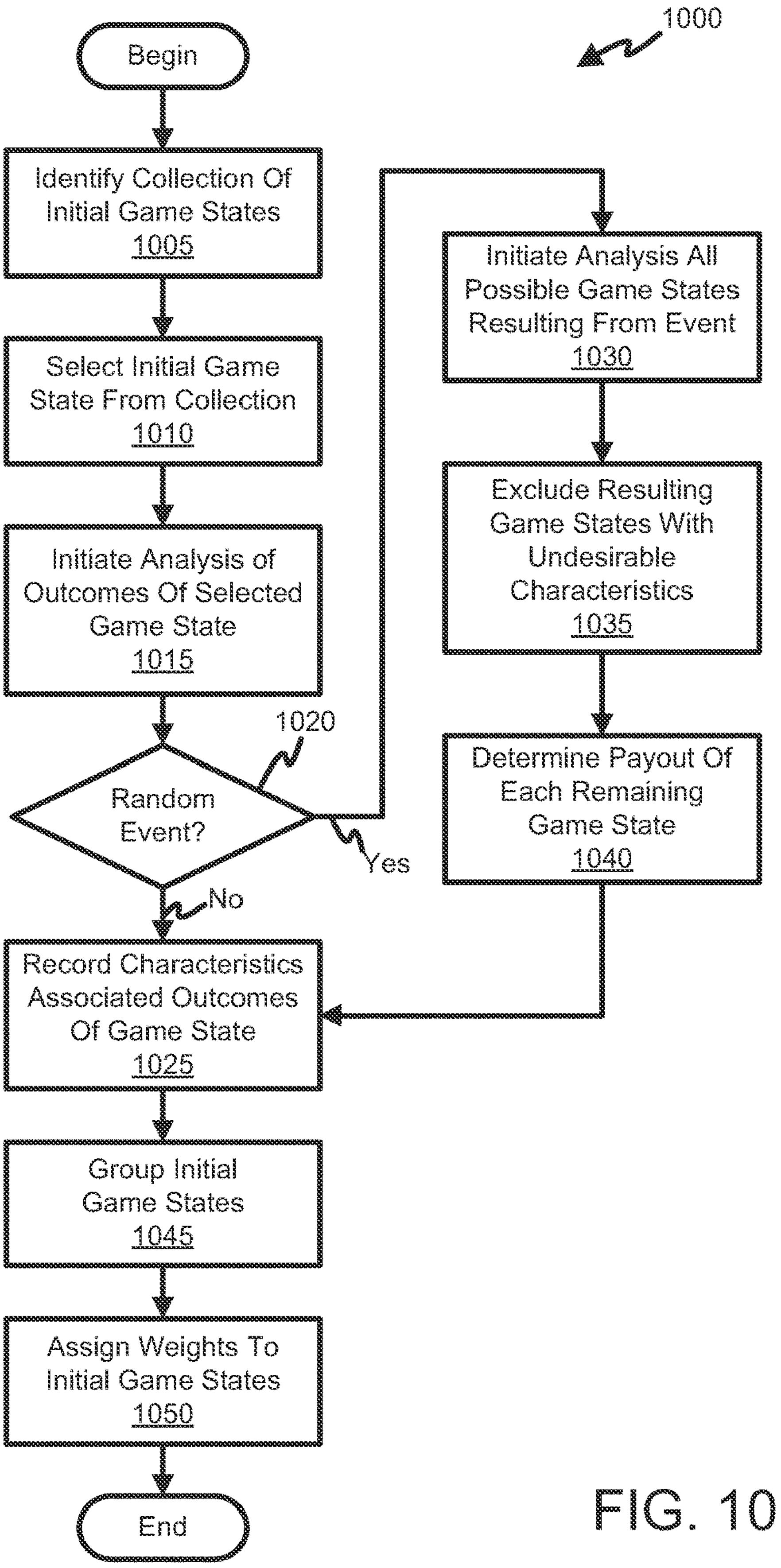
FIG. 10 depicts a flowchart of an exemplary process of providing a skill-based game with a predetermined return-to-player in accordance with various aspects of the present disclosure.

Referring to FIG. 10, a flowchart is shown of an exemplary method 1000 for providing a skill-based game with a predetermined return-to-player in accordance with various aspects discussed herein. In particular, the method 1000 generally captures the design process discussed above in regard to FIGS. 7A, 7B, 8, 9, and 13, but extends such process to other skill-based games in addition to the symbol matching game discussed above. The method 1000 may be executed by a computer system, such as computer system 1200 of FIG. 12, that is separate and distinct from the gaming machine 200 in order to determine and calculate various aspects of a skill-based game implemented by the gaming machine 200. In particular, the computing device 1200 may perform aspects of method 1000 as a result of one or more processors 1210 executing instructions of software or programs stored in memory 1220. In other embodiments, one or more aspects of the method 1000 may be executed by the gaming machine 200, for example, during a system initiation process prior to play of the skill-based game and/or during a gaming session in which the skill-based game is played.

At 1005, the computing system 1200 may identify an initial collection of valid initial game states for the skill-based game. In particular, the computing system 1200 may define the initial collection to include all game states that, per the rules of the skill-based game, define a valid game state from which the skill-based game may begin. In some embodiments, all initial game states are valid game states. As such, the initial collection may include all possible initial game states. In other embodiments, not all initial game states are valid game states. As such, the initial collection may include only a subset of all possible initial game states. For example, as explained above in regard to the exemplary skill-based feature game, an initial game state or start screen is valid if the start screen includes no matching patterns, but includes a least one valid move. Thus, the initial collection for such a skill-based feature game may exclude reel stop positions that correspond to a start screen that has a matching pattern and/or has no valid move.

The computing device 1200 may analyze each game state in the initial collection to ascertain various aspects (e.g., expected payouts) of each game state. To this end, the computing device 1200 at 1010 may select, from the initial collection, a game state that has yet to be analyzed. The computing device 1200 at 1015 may initiate an analysis of all possible outcomes of the selected game state. To this end, the computing device 1200 may traverse a decision tree 1300 associated with the selected game state by traversing edges 1340 of the decision tree 1300 that represent a series of choices during play of the skill-based game.

If computing device 1200 determines at 1020 that the selected game state does not encounter a random event such as, for example, a respin event, then computing device 1200 at 1025 may simply record various characteristics about the selected game state. For example, the computing device 200 may record an expected minimum payout and an expected maximum payout for the selected initial game state. Moreover, the computing device 200, as explained above, may further record additional characteristics associated with the initial game state such as, for example, the expected average payout, the average number of choices presented to the player, the expected minimal number of tumbles, the expected maximum number of tumbles, the expected average number of tumbles, the expected minimum number of box hits, the expected maximum number of box hits, the expected average number of box hits, and/or any other characteristics, which may aid the computing device 1200 and/or a game designer in selecting initial game states for inclusion in or exclusion from the skill-based game.

In general, a random event results in a randomly determined transition from the triggering game state to a next game state. However, such a random event may introduce, into the decision tree 1300, an inordinate number of intermediary nodes 1320 that each directly descend from the game state triggering the random event. What constitutes and does not constitute an inordinate number of direct descendants depends on the nature of the skill-based game as well as the processing power of the computing device 1200. However, in some embodiments, an inordinate number of direct descendants may refer to greater than twenty, greater than hundred, or greater than a thousand direct descendants.

If the computing device 1200 determines at 1020 that the selected game state encounters a random event, the computing device 1200 at 1030 may initiate analysis of all possible game states that result from the random event. In particular, for each resulting game state, the computing device 1200 may determine the expected minimum payout and expected maximum payout as well as possibly other characteristics of the respective game state.

At 1035, the computing device 1200 may exclude game states resulting from the random event that possess undesirable characteristics. For example, the computing device 1200 may exclude reel stop positions from being selected by a respin event that correspond to a game state without a valid move or to a game state that already includes a matching pattern.

At 1040, the computing device 1200 may determine the expected minimum payout, the expected maximum payout, as well as possibly other characteristics from the remaining possible game states resulting from the random event. To this end, the computing device 1200 may update characteristics of the branch 1350 based on the characteristics of a collective leaf node 1335 that collectively represents a group of possible game states resulting from the encountered random event. The collective leaf node 1335 may have various associated characteristics such as, for example, the expected minimum payout, the expected maximum payout as well as possibly other characteristics of the games states and game play following the random event.

In one embodiment, such characteristics may be precalculated or predetermined for each class of game states that may trigger a random event prior to the executing of the method 1000. In particular, classes of game states may be identified and characteristics predetermined or precalculated in a reverse order of game play. For example, in a game providing a player three turns, the computing device 1200 may define a first class of game states in which the player has one turn remaining and a second class of game states in which the player has two turns remaining. The computing device 1200 may then utilize predetermined characteristics for the first class when predetermining and/or precalculating characteristics for the second class. Similarly, the computing device 1200 may then utilize predetermined characteristics for the first and second classes when analyzing the initial game state. This reverse order of game play or bottom-up approach to designing the skill-based game provides an absolute certainty of the outcomes, allowing precise control of the starting screens, re-spin screens, and the return-to-player. Moreover, this bottom-up approach may be readily applied to any skill-based game having a finite number of moves.

For example, in the exemplary matching game described above, one class of games states may include all game states that (i) trigger a respin event, (ii) include a box symbol still needing a hit, and (iii) provide the player with one remaining move. Characteristics of a respin triggered from a game state of such a class of game states may be precalculated and/or predetermined. Whenever a respin event is encountered for a game state in the class of game states, a collective node 1335 may be added to the decision tree 1300 to essentially add its predetermined characteristics to the branch 1350 of the decision tree 1300. In this manner, characteristics such as expected minimum payout, expected maximum payout, etc. may be determined once for a class of game states and then attached to each intermediary node 1320 corresponding to a game state in the class.

Thus, the computing device 1200 at 1040 may update characteristics of the branch 1350 by adding the expected minimum payout of the attached collective leaf node 1335 to the minimum payout associated with the intermediary node 1320 that triggered the random event. Similarly, the computing device 1200 may add the expected maximum payout of the attached collective leaf node 1335 to the maximum payout associated with the intermediary node 1320 that triggered the random event. The computing device 1200 may also update other characteristics of the branch 1350 based on corresponding characteristics of the collective leaf node 1335.

For the selected initial game state, the computing device 1200 at 1025 may record characteristics associated with the selected game state. In particular, the computing device 1200 may record the lowest minimum payout and the highest maximum payout across all branches 1350 of the decision tree 1300. The computing device 1200 may similarly record other worst characteristics and best characteristics across all branches 1350 of the decision tree 1300 for the selected initial game state. In this manner, the computing device 1200 may obtain expected minimum payouts, expected maximum payouts, as well as other characteristics for each initial game state regardless of whether the initial game state encounters a random event.

After obtaining characteristics for each initial game state, the computing device 1200 and/or game designer at 1045 may group game states having similar characteristics in a manner similar to FIG. 9. In particular, the computing device 1200 may group games states based on the expected minimum payout for the game state and determine collective characteristics for the group. For example, the computing device 1200 may determine the average maximum payout, the average minimum payout, and other collective characteristics of the game states in the group.

The computing device 1200 and/or game designer at 1050 may assign weights to each initial game state based on the obtained characteristics for the groups of game states and/or games states individually. Via such weights, the odds of selecting each initial game state may be increased or decreased with respect to other initial game states. Moreover, as explained above, certain initial game states may be excluded by simply assigning a weight of zero to the game state. Furthermore, by adjusting the weights assigned to the initial game states, the computing device 1200 and/or game designer may ensure certain design requirements are achieved. In particular, the computing device 1200 and/or game designer may assign the weights in a manner that ensures that the resulting skill-based game provides a minimum return-to-player (e.g., no less than 80% of collected bets are returned to the player) and that a maximum return-to-player (e.g., no more than 95% of collected bets are return to the player) satisfy design requirements of various regulatory authorities and/or gaming machine operators.

Figure 11A:
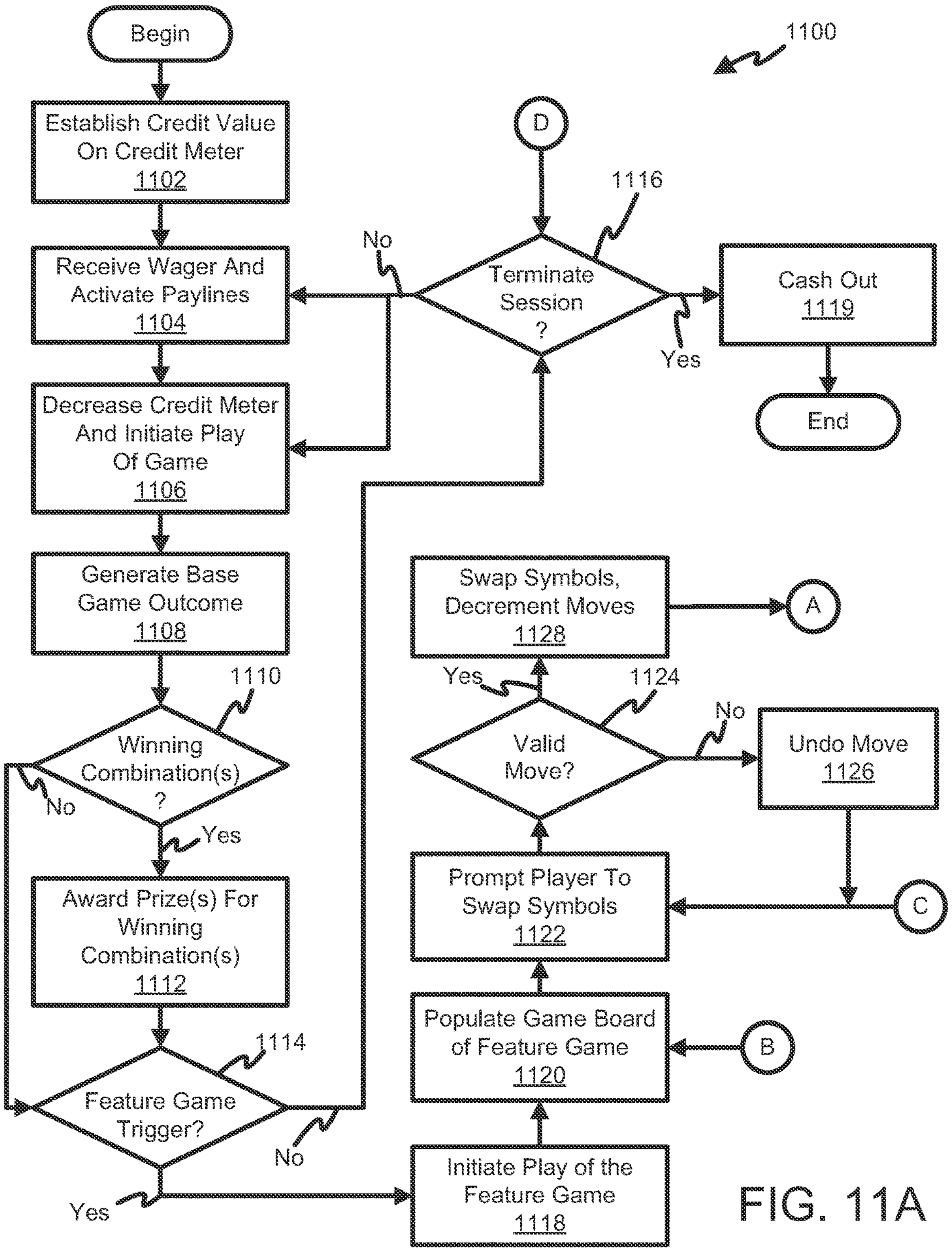
FIGS. 11A and 11B depict a flowchart of an exemplary process for playing a spinning reel game with a skill-based feature game in accordance with various aspects of the present disclosure.
Figure 11B:
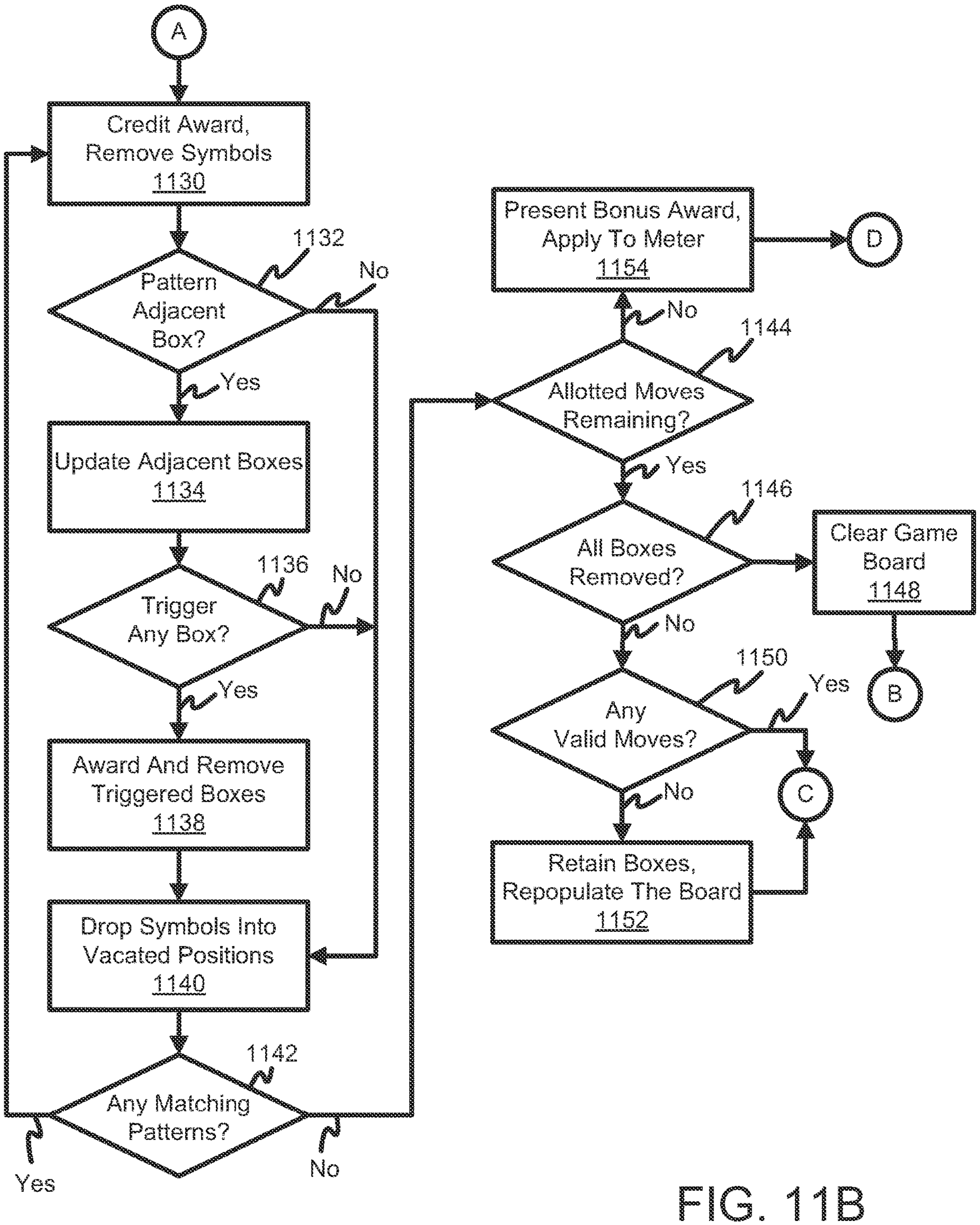

Referring to FIGS. 11A and 11B, a flowchart is shown of a method 1100 of playing a slot or spinning reel base game of gaming machine 200 having a skill-based feature game in accordance with aspects discussed above. While presented as a feature game of a spinning reel base game, the skill-based game may also be implemented as base game or as a feature, bonus, secondary game, etc. of another type of base game. Moreover, the following describes a gaming machine 200 performing various tasks. However, the gaming machine 200, in various embodiments, may performs one or more such tasks as a result of one or more processors 204 of its game controller 202 executing instructions of game software or programs 206 stored in memory 208.

Turning now to 1102 of FIG. 11A, the gaming machine 200 may establish a credit value on a base game credit meter. To this end, a player may insert a physical item having monetary value into the credit input mechanism 210 of the gaming machine 200. In response to the received physical item, the gaming machine 200 may increase a credit value of the base game credit meter based on the monetary value of the physical item.

At 1104, the gaming machine 200 may receive a wager and may activate one or more pay lines. In particular, a player may actuate one or more buttons 208 of the gaming machine 200 to specify a value of a wager funded by the credit value of the base game credit meter. Furthermore, in some embodiments, the gaming machine 200 may selectively activate a number of pay lines based on the specified value of the wager. In other embodiments, the gaming machine 200 may permit the player to specify via buttons 208 which pay lines to activate and a value to wager on each activated pay line.

After receiving the wager and activating one or more pay lines, the gaming machine 200 at 1106 may decrease the base game credit meter by the specified wager and initiate play of a spinning reel game. In particular, the gaming machine 200 may initiate the spinning reel game by spinning mechanical or virtual reels. For example, the gaming machine 200 may initiate play in response to the player pressing a button 236, pulling a handle, etc. of the gaming machine 200. In some embodiments, the spinning reel base game the skill-based feature game may use the same reel set 600. In other embodiments, the spinning reel base game may use a reel set having a different number of reel strips, a different ordered symbol set on the respective strips, and/or different game symbols than the reel set of the skill-based feature game.

At 1108, the gaming machine 200 may generate a base game outcome by stopping the reels. In particular, the gaming machine 200 may determine a reel stop position based on one or more random values generated by RNG 212 to obtain a base game outcome comprising a first array of symbols. In other embodiments, the gaming machine 200 may stop the reels based on information received from central determination gaming system server 106.

The gaming machine 200 at 1110 may determine whether the base game outcome include a winning combination of symbols along one of the activated pay lines. If the base game outcome includes a winning combination along one of the activated pay lines, then the gaming machine 200 at 1112 may award a prize or prizes associated with the winning combination or combinations. In particular, the gaming machine 200 may award the prize(s) by increasing the credit value of the base game credit meter based on the prize(s) for the winning combination(s).

Regardless of whether a winning combination is present, the gaming machine 200 at 1114 may determine whether the feature game has been triggered due to an occurrence of a feature game trigger. For example, a feature game trigger may correspond to the base game outcome including a particular combination of symbols along one of the activated pay lines. The feature game trigger may also correspond to the base game outcome including a predetermined number of scatter symbols regardless of their relation to activated pay lines. In some embodiments, the gaming machine 200 and/or central determination gaming system server 106 may simply randomly trigger the feature game. In yet other embodiments, the gaming machine 200 may trigger the feature game based on symbols collected over a series of plays of the spinning reel base game. Other manners of triggering the skill-based feature game are contemplated.

If the feature game has not been triggered, then the gaming machine 200 at 1116 may determine whether the player wishes to terminate the current gaming session. For example, the player may press a button 236 of the gaming machine 200 to "cash out" and terminate the gaming session. If the player terminates the gaming session, the gaming machine 200 at 1119 may cash out any remaining credit value on the base game credit meter to the player via a credit output mechanism of the gaming machine. For example, the gaming machine 200 may transfer the remaining credit value by dispensing the appropriate number of coins via a coin tray or by printing a ticket with the appropriate monetary value via a printer 222. If the player wishes to continue the gaming session, the gaming machine 200 may return to 1104 to permit the player to adjust the wager and/or number of activated pay lines or may return to 1106 to permit the player to initiate play of another game using the current established wager and activated pay line.

In response to the feature game trigger, the gaming machine 200 at 1118 may initiate play of the skill-based feature game and allot a number of moves (e.g. three moves) to the player. In particular, the gaming machine 200 may initiate play of the skill-based feature game in response to the player pressing a button 236, pulling a handle, etc. of the gaming machine 200.

At 1120, the gaming machine 200 may populate the game board 300 with an initial start screen. To this end, the gaming machine 200 may populate the game board with four box symbols 320 and set their numeric value to a initial value (e.g., four). See, e.g., FIG. 3. The game machine 200 may further populate the remaining display positions 310 of the game board 300 with game symbols 330 per the reel set 600 and a randomly selected reel stop position. See, e.g., FIG. 4.

In particular, the gaming machine 200 may select a reel stop position for the reel strips $610_1$-$610_5$ based on one or more random values generated by the RNG 212. In other embodiments, the gaming machine 200 may select a reel stop position based on information received from central determination gaming system server 106. The gaming machine 200 may display the populated game board 300 via the primary game display 240 and/or the secondary game display 242. Moreover, since the reel strips $610_1$-$610_5$ specify an ordered symbol set of symbols for populating and filling the game board 300, the gaming machine 200 in some embodiments may further display a preview of one or more upcoming symbols from the reel strips $610_1$-$610_5$ on the display 240 and/or 242. In particular, the gaming machine 200 may present such preview of symbols in a manner similar to the depiction of reel strips $611_1$-$611_3$ in FIGS. 7A and 7B in which the upcoming symbols are displayed above the game board 301. Such preview of symbols may aid players in planning out their moves.

In some embodiments, the gaming machine 200 may select the reel stop position from a subset of reel stop positions for valid start screens. As noted above, a game designer may assign weights to each of the valid start screens. See, e.g. FIG. 9. As such, the gaming machine 200 may select the reel stop position based on the assigned weights in a manner that ensures higher-weighted reel stop positions are selected more often than lower-weighted reel stop positions.

For example, memory 208 may include a list of the reel stop positions for the valid start screens. Moreover, the list may include, for each reel stop position, a number of entries that is dependent upon its assigned weight. For example, the two start screens with a minimum payout of 615 credits were assigned a weight of one in FIG. 9. Thus, the list may include a separate entry for each of the two start screens, for a total of two entries associated with the minimum payout of 615 credits. Similarly, the thirty start screens with a minimum payout of 1020 credits were assigned a weight of ten in FIG. 9. Thus, the list may include ten separate entries for each of the thirty start screens for a total of three hundred entries associated with the minimum payout of 1020 credits. The gaming machine 200 may further assign or otherwise associate each entry in the list with a unique number (e.g., a number between 0 and the number of entries minus one). The RNG 212 may be configured to generate a random number uniformly distributed across 0 and the number of entries minus one. The gaming machine 200 may then retrieve the reel stop position associated with the generated random number from the list. In this manner, the gaming machine 200 may randomly select reel stop positions and their respective start screen per the assigned weights. In other embodiments, various other techniques for randomly selecting the reel stop position and associated start screens per the assigned weights may be used.

The gaming machine 200 at 1122 may prompt the player to swap two adjacent game symbols 330. Such prompt may be via an audio message presented via speakers 220 and/or via a textual message presented via the primary game display 240, the secondary game display 242, and/or another display of the gaming machine 200. In reply to such prompt, the gaming machine 200 may receive via the player interface input signal indicative of the game symbols 330 to be swapped.

For example, such input signals may be generated in response to the player activating buttons 236 and/or touch screens of the displays 240, 242 to identify which two game symbols 330 are to be swapped. In particular, the player may touch a first game symbol 330 displayed on the game board 300 and then touch a second game symbol 330 displayed on the game board 300. Alternatively, the player may touch a first game symbol 330 and drag the first game symbol 330 atop a second game symbol 330, and then stop touching to drop the first game symbol 330 onto the second game symbol 330. In this manner, the gaming machine 200 may permit dragging-and-dropping a first game symbol onto a second game symbol in order to identify two game symbols that the player wishes to swap. Whether separately touching two game symbols, dragging-and-dropping a game symbol, or some other gesture, the player touches may result in a touch screen associated with the displayed game board 300 generating signals that identify the two symbols 330 the player wishes to swap.

At 1124, the gaming machine 200 may determine whether the received input signals represent a valid move. For example, the requested move may be invalid because the two game symbols are not adjacent to another. The requested move may also be invalid because swapping the two game symbols would not form a matching pattern $\mathbf{500_1}$-$\mathbf{500_5}$ of game symbols 330. If not a valid move, the gaming machine 200 at 1126 reverses, ignores, or undoes the requested swap of game symbols and returns to 1122 to prompt the player to swap two game symbols 330.

Otherwise, the gaming machine 200 at 1128 may swap the selected game symbols 330 in the presented game board 300 and decrement the number of moves allotted to the player. At 1130 of FIG. 11B, the gaming machine 200 may update a feature game credit meter based on awards associated with matching patterns $\mathbf{500_1}$-$\mathbf{500_5}$ of game symbols 330 and remove the game symbols 330 of the matching patterns $\mathbf{500_1}$-$\mathbf{500_5}$ from the game board 300. In some embodiments, the gaming machine 200 may animate the removal of the gaming symbols 330 to increase excitement of the game play. For example, the gaming machine 200 may depict the removal of the game symbols 330 as exploding, crumbling, flying about the game board 300, or some other visually-appealing animated sequence involving the game symbols 330 being removed.

At 1132, the gaming machine 200 may further determine whether any of the matching patterns $\mathbf{500_1}$-$\mathbf{500_5}$ were adjacent to a box symbol $\mathbf{320_1}$-$\mathbf{320_4}$. If adjacent to one or more box symbols $\mathbf{320_1}$-$\mathbf{320_4}$, the gaming machine 200 at 1134 updates the numeric value associated with each adjacent box symbol $\mathbf{320_1}$-$\mathbf{320_4}$ (e.g., decrements by one). At 1136, the gaming machine 200 may further determine whether the numeric value of any of the box symbols $\mathbf{320_1}$-$\mathbf{320_4}$ has reached a trigger value (e.g. zero). If the trigger value has been reached, the gaming machine 200 at 1138 removes the triggered box symbol $\mathbf{320_1}$-$\mathbf{320_4}$ and awards a prize (e.g. 200 credits) for each triggered box symbol $\mathbf{320_1}$-$\mathbf{320_4}$. Similar to the removal of the game symbols 330, the gaming machine 200 may depict the removal of the box symbols $\mathbf{320_1}$-$\mathbf{320_4}$ as exploding, crumbling, opening, or some other visually-appealing animated sequence involving the respective box symbol $\mathbf{320_1}$-$\mathbf{320_4}$ being removed.

After removing the game symbols 330 and possibly one or more box symbols $\mathbf{320_1}$-$\mathbf{320_4}$, the gaming machine 200 at 1140 may drop or cascade down game symbols 330 of the game board 300 into the vacated display positions 310. Moreover, the gaming machine 200 may drop or cascade down game symbols 330 from the reel strips $\mathbf{610_1}$-$\mathbf{610_5}$. As explained above, the reel strips $\mathbf{610_1}$-$\mathbf{610_5}$ provide an ordered symbol set. Thus, the vacated display positions 310 are filled with game symbols 330 in a predetermined manner specified by the reel strips $\mathbf{610_1}$-$\mathbf{610_5}$ and the selected reel stop position.

At 1142, the gaming machine 200 may determine whether cascading game symbols 330 into the vacated display positions 310 resulted in further matching patterns $\mathbf{500_1}$-$\mathbf{500_5}$. If further matching patterns $\mathbf{500_1}$-$\mathbf{500_5}$ were formed, the gaming machine 200 returns to 1130 in order to award and remove the newly formed matching patterns $\mathbf{500_1}$-$\mathbf{500_5}$.

At 1144, the gaming machine 200 may determine whether the player still has allotted moves to make. If the player has further allotted moves to make, the gaming machine 200 at 1146 may determine whether all box symbols $\mathbf{320_1}$-$\mathbf{320_4}$ have been removed from the game board 300. If all box symbols $\mathbf{320_1}$-$\mathbf{320_4}$ have been removed, the gaming machine 200 at 1148 may clear the game board 300 and return to 1120 of FIG. 11A in order to repopulate the game board 330 with an initial start screen.

If all box symbols $\mathbf{320_1}$-$\mathbf{320_4}$ have not been removed from the game board 300, the gaming machine 200 at 1150 may determine whether any valid moves remain. In particular, the gaming machine 200 may determine whether the game board 300 includes at least one swap of adjacent game symbols 330 that would result in a matching pattern $\mathbf{500_1}$-$\mathbf{500_5}$. If valid moves remain, the gaming machine 200 may return to 1122 of FIG. 11A in order to prompt the player to swap two game symbols 330.

However, if no valid moves remain, the gaming machine 220 at 1152 may repopulate the game board 300 with game symbols 330 such that the repopulated game board 300 includes at least one valid move and no matching patterns $\mathbf{500_1}$-$\mathbf{500_5}$. To this end, the gaming machine 220 may clear the game board 300 of game symbols 330, but retain any remaining box symbols $\mathbf{320_1}$-$\mathbf{320_4}$ along with their current numeric values. The gaming machine 220 may then randomly select a reel stop position for the reel set 600 with the aid of the RNG 212 or the central determination gaming system server 106. The gaming machine 220 may further verify that the newly selected reel stop position for the reel set 600 results in a populated game board 300 having no matching patterns $\mathbf{500_1}$-$\mathbf{500_5}$ and at least one swap that results in a matching pattern $\mathbf{500_1}$-$\mathbf{500_5}$. If the selected reel stop position fails to populate the game board 300 appropriately, then the game machine 220 may repeatedly select a new random reel stop position and verify the resulting game board 300 until an appropriately populated game board 300 is achieved. The gaming machine 220 may then return to 1122 of FIG. 11A in order to prompt the player to swap two game symbols 330.

Returning to 1144, if the player has no allotted moves to make, then the gaming machine 200 at 1154 may present via one of the displays 240, 242 the credit balance of the feature game credit meter in order to inform the player of the total award won by the player during the feature game. Moreover, the gaming machine 200 may further apply the credit balance of the feature game credit meter to the base game credit meter before returning to 1116 of FIG. 11A in order to provide the player with an opportunity to terminate the session.

Figure 12:
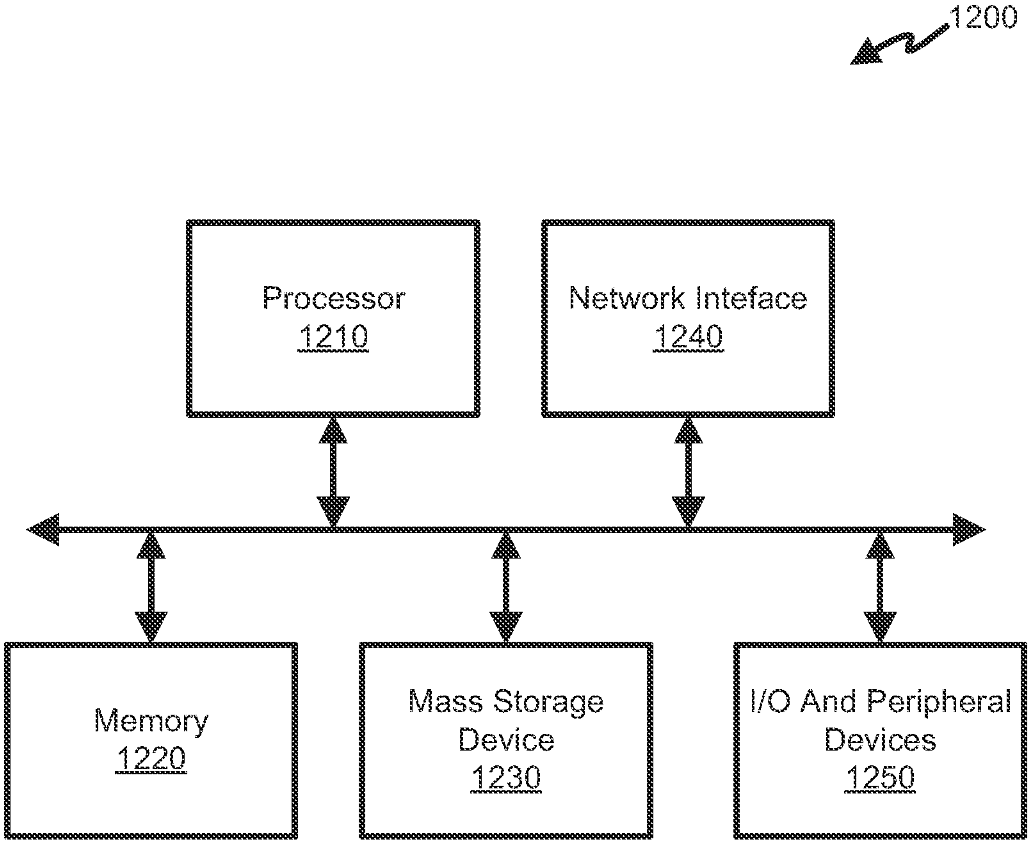
FIG. 12 depicts an exemplary computing device suitable for executing one or more aspects of the method of FIG. 10.

Referring now to FIG. 12, a simplified depiction of a computing device 1200 suitable for implementing aspects of the method 1000 is shown. As shown, the computing device 1200 may include a processor 1210, a memory 1220, a mass storage device 1230, a network interface 1240, and various input/output (I/O) and peripheral devices 1250. The processor 1210 may be configured to execute instructions, manipulate data and generally control operation of other components of the computing device 1200 as a result of its execution. To this end, the processor 1210 may include a general purpose processor such as an x86 processor or an ARM processor which are available from various vendors. However, the processor 1210 may also be implemented using an application specific processor, microcontroller, and/or other circuitry.

The memory 1220 may include various types of random access memory (RAM) devices, read only memory (ROM) devices, flash memory devices, and/or other types of volatile or non-volatile memory devices. In particular, such memory devices of the memory 1220 may store instructions and/or data to be executed and/or otherwise accessed by the processor 1210. In some embodiments, the memory 1220 may be completely and/or partially integrated with the processor 1210.

In general, the mass storage device 1230 may store software and/or firmware instructions which may be loaded in memory 1220 and executed by processor 1210. The mass storage device 1230 may further store various types of data which the processor 1210 may access, modify, and/otherwise manipulate in response to executing instructions from memory 1220. To this end, the mass storage device 1230 may comprise one or more redundant array of independent disks (RAID) devices, traditional hard disk drives (HDD), sold state device (SSD) drives, flash memory devices, read only memory (ROM) devices, and/or other types of non-volatile storage devices.

The network interface 1240 may enable the computing device 1200 to communicate with other computing devices via a network. To this end, the networking interface 1240 may include a wired networking interface such as an Ethernet (IEEE 802.3) interface, a wireless networking interface such as a WiFi (IEEE 802.11) interface, a radio or mobile interface such as a cellular interface (GSM, CDMA, LTE, etc.) or near field communication (NFC) interface, and/or some other type of networking interface capable of providing a communications link between the computing device 1200 and and/or another computing device 1200 or gaming machine 200 via a network.

Finally, the I/O and peripheral devices 1250 may generally provide devices which enable a user to interact with the computing device 1200 by either receiving information from the computing device 1200 and/or providing information to the computing device 1200. For example, the I/O and peripheral devices 1250 may include display screens, keyboards, mice, touch screens, microphones, audio speakers, digital cameras, optical scanners, RF transceivers, etc.

While the above provides some general aspects of a computing device 1200, those skilled in the art readily appreciate that there may be significant variation in actual implementations of a computing device. For example, a smart phone implementation of a computing device generally uses different components and may have a different architecture than a workstation implementation of a computing device. However, despite such differences, computing devices generally include processors that execute software and/or firmware instructions in order to implement various functionality. As such, the above described aspects of the computing device 1200 are not presented from a limiting standpoint but from a generally illustrative standpoint. The present application envisions that aspects of the present application may find utility across a vast array of different computing devices and the intention is not to limit the scope of the present application to a specific computing device and/or computing platform beyond any such limits that may be found in the appended claims.

Moreover, certain embodiments may be implemented as a plurality of instructions on a non-transitory, computer readable storage medium such as, for example, flash memory devices, hard disk devices, compact disc media, DVD media, EEPROMs, etc. Such instructions, when executed by one or more computing devices, may result in the one or more computing devices implementing one or more aspects of the methods depicted FIGS. 10 and 11A-B.

The present disclosure describes exemplary embodiments. Modifications of the above disclosed apparatus and methods which fall within the scope of the appended claims will be readily apparent to those of ordinary skill in the art. For example, although the examples discussed above are illustrated for a gaming market, embodiments of the disclosure can be implemented for other markets. Accordingly, while the present disclosure has set forth various exemplary embodiments, other embodiments may fall within the spirit and scope of the following claims.

What is claimed is:

1. A gaming system, comprising:

a server configured to randomly select an initial game screen from a plurality of initial game screens based on data that specifies, for each initial game screen of a plurality of initial game screens, a respective predetermined minimum return-to-player and a respective likelihood of being randomly selected which collectively define a predetermined minimum return-to-player for a game; and a computing device configured to:

present a credit balance of a credit meter funded per a monetary value of a physical item received by a credit input mechanism of the computing device and decreased per a wager;

display a plurality of symbols at a plurality of display positions of the computing device per an initial symbol arrangement specified by the initial game screen selected by the server from the plurality of initial game screens;

receive, via a player interface of the computing device, input signals representative of a move;

display an update of one or more symbols in the plurality of display positions responsive to the move represented by the input signals;

present an award based on the update of the one or more symbols in the plurality of display positions; and present an update of the credit balance per the award.

2. The gaming system of claim 1, wherein the computing device is configured to update the one or more symbols by swapping two symbols from the plurality of symbols.

3. The gaming system of claim 1, wherein the computing device is configured to display the update of the one or more symbols by displaying a swap of two adjacent symbols selected via the player interface.

4. The gaming system of claim 1, wherein the computing device is configured to display the update based on information received from the server.

5. The gaming system of claim 1, wherein the computing device is configured to present the award based on information received from the server.

6. The gaming system of claim 1, wherein:

the server is configured to randomly select the initial game screen by randomly selecting a plurality of reel stops for a plurality of reel strips, and provide the selected plurality of reel stops to the computing device; and the computing device is configured to fill the plurality of display positions with symbols per ordered symbol sets specified by the plurality of reels strips and the plurality of reel stops received from the server.

7. The gaming system of claim 1, wherein the update of the one or more symbols comprises:

a winning pattern of symbols removed from the plurality of display positions to form a plurality of vacated display positions; and a first symbol in a first display position from the plurality of display positions dropped into a vacated display position from the plurality of vacated display positions.

8. The gaming system of claim 1, wherein the update of the one or more symbols comprises a first display position filled with a symbol specified by an ordered symbol set of a first reel strip.

9. The gaming system of claim 8, wherein:

the first display position corresponds to a first column of display positions; and the ordered symbol set of the first reel strip specifies symbols to be displayed in the first column of display positions.

10. The gaming system of claim 1, wherein:

the initial symbol arrangement comprises a box symbol;

the update of the one or more symbols comprises a numeric value associated with the box symbol reduced responsive to a winning pattern of symbols formed adjacent the box symbol; and the computing device is configured to present an award associated with the box symbol responsive to the numeric value having a predetermined relationship to a predetermined trigger value.

11. The gaming system of claim 10, wherein the update of the one or more symbols comprises:

the box symbol removed responsive to the numeric value having the predetermined relationship to the predetermined trigger value; and a first symbol in a first display position from the plurality of display positions dropped into a display position vacated by the removed box symbol.

12. The gaming system of claim 1, wherein, in response to determining that no legal moves remain:

the server is configured to select another plurality of reel stops corresponding to a symbol arrangement with at least one legal move; and the computing device is configured to repopulate the plurality of display positions per the symbols arrangement specified by the another plurality of reel stops.

13. A method of a gaming system comprising a server and a computing device, the method comprising:

randomly selecting, with the server per a respective likelihood associated with each initial game screen of a plurality of initial game screens, an initial game screen from the plurality of initial game screens, wherein each initial game screen has a respective predetermined minimum return-to-player, and wherein the respective predetermined minimum return-to-player and the respective likelihood of each initial screen collectively define a predetermined minimum return-to-player for a game;

presenting, via the computing device, a credit balance of a credit meter funded per a monetary value of a physical item received by a credit input mechanism of the computing device and decreased per a wager;

causing the computing device to display, at a plurality of display positions of the computing device, a plurality of symbols per an initial symbol arrangement specified by the initial game screen selected by the server from the plurality of initial game screens;

updating one or more symbols in the plurality of display positions per a move received via a player interface of the computing device to obtain an updated plurality of symbols;

causing the computing device to display an award associated with the updated plurality of symbols; and presenting, via the computing device, an update of the credit balance per the award.

14. The method of claim 13, wherein updating the one or more symbols comprises swapping two symbols from the plurality of symbols.

15. The method of claim 13, wherein causing the computing device to display the plurality of symbols causes the computing device to display the plurality of symbols based on information from the server.

16. The method of claim 13, wherein causing the computing device to display the award causes the computing device to display the award based on information from the server.

17. The method of claim 13, wherein:

randomly selecting the initial game screen specifies a plurality of reel stops for a plurality of reel strips of the computing device, wherein each reel strip provides an ordered symbol set; and causing the computing device to display the plurality of symbols comprises providing the computing device with the plurality of reel stops.

18. The method of claim 13, wherein updating the one or more symbols comprises:

removing a winning pattern of symbols to form a plurality of vacated display positions; and dropping a first symbol above a first vacated display position into the first vacated display position.

19. The method of claim 13, wherein:

the initial symbol arrangement comprises a box symbol;

updating the one or more symbols comprises reducing a numeric value associated with the box symbol in response to a winning pattern of symbols formed adjacent the box symbol; and causing the computing device to display the award causes the computing device to display an award associated with the box symbol if the numeric value has a predetermined relationship to a predetermined trigger value.

20. The method of claim 13, wherein, in response to determining that no legal moves remain:

selecting, with the server, another initial game screen from the plurality of initial game screens; and causing the computing device to repopulate the plurality of display positions per the another initial game screen.

* * * * *